US005659214A

United States Patent [19]

Guardiani et al.

[11] Patent Number: 5,659,214

[45] Date of Patent: Aug. 19, 1997

[54] SUBMERSIBLE CANNED MOTOR TRANSFER PUMP

[75] Inventors: Richard F. Guardiani, Ohio Township, Allegheny County; Richard D. Pollick, Sarver; Charles P. Nyilas, Monroeville; Timothy J. Denmeade, Lower Burrell, all of Pa.

[73] Assignee: Westinghouse Electric Corporation, Pittsburgh, Pa.

[21] Appl. No.: 397,801

[22] Filed: Mar. 3, 1995

[51] Int. Cl.$^{6}$ .............................. H02K 5/10; H02K 5/16; F04B 17/00

[52] U.S. Cl. .......................... 310/87; 310/90; 417/423.3; 417/423.12

[58] Field of Search .............................. 417/423.3, 423.8, 417/366, 367, 423.9, 423.12, 423.13, 422, 360, 431, 430; 310/87, 89, 88, 58, 89.9, 59, 90, 54; 415/111

[56] References Cited

U.S. PATENT DOCUMENTS

| | | | |
|---|---|---|---|
| 2,871,791 | 2/1959 | Litzenberg | 417/423.12 |
| 2,906,208 | 9/1959 | White | 417/423.12 |
| 5,101,128 | 3/1992 | Veronesi et al. | 310/54 |
| 5,185,545 | 2/1993 | Veronesi et al. | 310/114 |
| 5,213,468 | 5/1993 | Sexton et al. | 415/121.3 |
| 5,220,231 | 6/1993 | Veronesi et al. | 310/90 |
| 5,252,875 | 10/1993 | Veronesi et al. | 310/114 |
| 5,408,155 | 4/1995 | Dickinson et al. | 310/90 |
| 5,490,768 | 2/1996 | Veronesi et al. | 417/356 |

*Primary Examiner*—Steven L. Stephan
*Assistant Examiner*—Michael Wallace, Jr.

[57] ABSTRACT

A transfer pump used in a waste tank for transferring high-level radioactive liquid waste from a waste tank and having a column assembly, a canned electric motor means, and an impeller assembly with an upper impeller and a lower impeller connected to a shaft of a rotor assembly. The column assembly locates a motor housing with the electric motor means adjacent to the impeller assembly which creates an hydraulic head, and which forces the liquid waste, into the motor housing to cool the electric motor means and to cool and/or lubricate the radial and thrust bearing assemblies. Hard-on-hard bearing surfaces of the bearing assemblies and a ring assembly between the upper impeller and electric motor means grind large particles in the liquid waste flow. Slots in the static bearing member of the radial bearing assemblies further grind down the solid waste particles so that only particles smaller than the clearances in the system can pass therethrough, thereby resisting damage to and the interruption of the operation of the transfer pump. The column assembly is modular so that sections can be easily assembled, disassembled and/or removed. A second embodiment employs a stator jacket which provides an alternate means for cooling the electric motor means and lubricating and/or cooling the bearing assemblies, and a third embodiment employs a variable level suction device which allows liquid waste to be drawn into the transfer pump from varying and discrete levels in the waste tank.

10 Claims, 15 Drawing Sheets

SUBMERSIBLE CANNED MOTOR TRANSFER PUMP

This invention was conceived or first reduced to practice in the course of, or under contract number DE-AC06-87RL10930 between the Westinghouse Hanford Company and the United States Government, represented by the Department of Energy. The United States Government may have rights in this invention.

RELATED PATENT APPLICATIONS

This patent application is related to two patent applications commonly assigned and owned, entitled "A Submersible Canned Motor Mixer Pump", Ser. No. 08/398,412, and "A Variable Level Suction Device", Ser. No. 08/398,479, filed concurrently with this patent application.

BACKGROUND OF THE INVENTION

1. Field of the Invention

This invention relates to a motor slurry or transfer pump and more particularly to a submersible canned motor transfer pump which transfers high-level radioactive liquid waste or sludge out of a waste tank.

2. Background of Information

Motor transfer pumps are used to transfer high-level radioactive liquid waste out of a waste tank which is approximately 50 to 60 feet deep and which has a diameter ranging from about 75 to about 85 feet with liquid capacities of approximately one million gallons. The liquid waste in the tank is mobilized by a motor mixer pump which agitates the liquid waste so that it is pumpable through the transfer pump. The liquid waste is pumped out of the tank by a transfer pump and may be transferred to another tank or the liquid may be separated from the solid radioactive waste which is vitrified and collected and sealed in containers which are generally buried in underground concrete vaults.

Presently, transfer pumps have an air cooled motor supported on a riser located at the top of the waste tank. The riser has about a 12 inch opening and a mounting flange on the riser suspends a line shaft through the opening and which line shaft must hang down into the tank for an insertion length of up to about 58 feet into the liquid waste in the tank for purposes of emptying the liquid waste out of the tank. The environment in which the transfer pump operates is extremely abrasive and hostile in that the radiation exposure to the components of the transfer pump is up to 300 megarads of gamma radiation. This radioactive liquid waste has a pH greater than 9.0; an absolute viscosity of 1.0 to 50.0 Cp; a specific gravity of about 1.0 to 1.7; a temperature of about 90° C.; and a relative humidity of up to about 100%. In addition, this liquid waste consists mainly of insoluble oxides and hydroxides of aluminum, iron, manganese, and zirconium in mixtures with water up to 50% solids by volume. These solid particles may have a diameter up to 0.040 inches.

These present-day transfer pumps with an air cooled motor driving a line shaft from outside the waste tank employs a column which houses the line shaft in the tank and is filled with pressurized water. At least 5 or more sets of bearings are mounted on the lineshaft to support the radial loads imposed on the long lineshaft, and the pressurized water in the column is used to lubricate the bearings. Mechanical seals are needed at the top and the bottom of the lineshaft to prevent the pressurized liquid in the column from escaping into the tank and to prevent the liquid waste in the tank from entering the column. Additionally, the column is comprised of several pipe pieces with flanges which are joined together requiring gaskets or seals, and the lineshaft consists of several shaft pieces coupled at about 10 ft. intervals. The bearings are located at the column pipe joints.

This present design for a transfer pump has several disadvantages; one being that it experiences a very short life in that it operates only for about 100 hours before it needs to be repaired or replaced. Another disadvantage is that the pressurized water in the column for lubricating the bearings leaks out of the column and into the contaminated liquid in the waste tank which adds to the amount of contaminated liquid which must be pumped out of the tank and processed. A further disadvantage is that the long lineshaft has poor rotor dynamic performance. With a multiple bearing system such as that in the present-day transfer pump, if wear occurs at one bearing, shaft vibration will increase greatly. Alignment of a multiple bearing system is difficult. One or two bearings are always highly loaded and prone to wear and/or failure. The transfer pump has seals which must be maintained. The seals are rubbing face seals which wear with time, particularly, if abrasive particles are present. These seals must either be replaced which is difficult to do with a radioactive pump or the pump must be disposed of if the seals leak too much.

"Canned" motors are well-known in the art and are disclosed or discussed in U.S. Pat. Nos. 5,101,128; 5,185,545; 5,220,231, and 5,252,875 which relate to submersible motor propulsor units.

Thus, there remains a need for a transfer pump used for transferring high-level radioactive liquid waste in a waste tank which has a longer mechanical and electrical life expectancy than current designs for a transfer pump.

There remains a further need for a transfer pump used in the environment discussed hereinabove which has a longer life in that it has an improved dynamic performance compared to present-day transfer pumps and does not require seals to prevent liquid from escaping out of or seeping into the long column which houses the lineshaft.

SUMMARY OF THE INVENTION

The transfer pump of the present invention for transferring high-level radioactive liquid waste or sludge out of a waste tank has met the above needs.

The transfer pump of the present invention is a two-stage centrifugal pump and includes a column assembly which positions a canned electrical motor means down into a waste tank. The motor is housed in a housing connected to the column assembly and has a canned stator, a canned rotor, and a rotatable shaft with an impeller assembly connected to the shaft. A radial bearing assembly is provided on one end of the shaft. A radial bearing assembly and a thrust bearing assembly are provided on the other end of the shaft. The impeller assembly has at least two impellers housed in a first stage diffuser and a second stage dumped diffusion casing designed to deliver the required head at a discharge opening of a riser. The casing has suction means for drawing the liquid waste into the casing. The impeller assembly forces the liquid waste up into the electric motor means to lubricate the bearing assemblies and to flow around the canned rotor and the canned stator for cooling the motor means. A ring assembly mounted adjacent to the upper impeller has bearing members being of the hard-on-hard type. The radial bearing assemblies are also of the hard-on-hard type, with the bearing members of the radial bearing assemblies and the ring assembly being preferably made of tungsten carbide, and whose bearing surfaces can function to progressively grind the large solid particles of the liquid waste which being pushed through by the process fluid make their way between the bearing surfaces. Slots are provided preferably in the static bearing members of the radial bearing assemblies so that the large solid particles are ground up in the slots and forced through the slots and properly disposed of.

The speed of the impellers and the design of the first stage diffuser and the second stage diffusion casing are such that a minimal amount of the liquid waste is forced upwardly into the bearing assemblies and the electric motor to lubricate the bearing assemblies and to cool the motor, and the main stream of the liquid waste is pumped out of the waste tank.

A purging system is also provided to clean out the liquid waste flow paths under certain conditions such as when the transfer pump has not been used for any length of time. The column supports the purging system and carries power cables for an electrical connection to the motor. A sparging system delivers fresh water to a sparge ring located in the suction means.

A column assembly through which the pumped liquid waste travels is modular in construction. The structural sections are less than 8 feet long and are bolted together for ease of disassembly, decontamination, and inspection. These structural sections can be added to, removed, or replaced so that the overall insertion of the transfer pump in the waste tank can be changed with minimum radiation exposure to the workmen.

A further embodiment of the present invention employs a jacket which is concentrically arranged around the electric motor means and the radial and thrust bearing assemblies and which provides cooling and/or lubrication thereto.

A still further embodiment of the present invention employs a variable level suction device used in conjunction with a transfer pump for selectively drawing liquid waste into an impeller assembly from the bottom of a waste tank or from a level, including a free surface of the liquid waste, above the impeller assembly of a submerged canned motor.

This variable level suction device comprises an hydraulic housing encasing an impeller assembly and a telescoping pipe assembly in flow communication with the hydraulic housing, and the hydraulic housing includes suction port means selectively opened when the liquid waste is to be drawn into the impeller assembly from the bottom of the waste tank in which instance the telescoping pipe assembly is extended out of the liquid waste beyond the free surface, and closed when the liquid waste is to be drawn into the impeller assembly from a liquid waste level above the hydraulic housing, in which instance the telescoping pipe assembly is compressed to extend below the free surface in a desired level in a range from the free surface to the hydraulic housing.

It is therefore an object of the present invention to provide a motor transfer pump which has a canned electric motor means which is submerged in liquid waste and which includes means for circulating the liquid waste to cool the motor means and to lubricate the bearings.

It is a further object of the present invention to provide an improved transfer pump used in a waste tank containing highly radioactive liquid waste and having a submersible canned motor which is cooled by the liquid waste and fluid-film type of bearing assemblies which are lubricated by the liquid waste.

It is a still further object of the present invention to provide an improved transfer pump used in. a highly abrasive, highly-radioactive environment which has a longer operating life than prior art transfer pumps.

It is a still further object of the present invention to provide a motor transfer pump which has a modular constructed such that its length can be changed and it can easily be assembled, disassembled, and/or inspected thereby minimizing radiation exposure to the workmen.

It is still a further object of the invention to provide an improved transfer pump which positions a "canned" motor near an impeller assembly which draws some of the liquid waste into the canned motor area and which pumps most of the liquid waste out of the transfer pump.

A still further object of the present invention is to provide an improved transfer pump which uses the liquid waste to lubricate radial and thrust bearing assemblies which include hard-on-hard bearing members with surfaces which form a fluid film therebetween for said lubrication, and which hard-on-hard bearing surfaces act to further grind down large liquid waste particles in the liquid waste flow.

Moreover, it is a further object of the present invention to provide a transfer pump which includes a device which initially grinds the large waste particles before they can enter the bearing assemblies.

A still further object of the present invention is to provide a transfer pump which includes abrasive means for grinding and/or discharging large particles of a liquid waste prior to their entering either the bearing assemblies and/or the electric motor means so that only particles less than the size of the radial and/or axial clearances in the system can pass through the bearing assemblies and the electric motor means with the processed liquid waste flow, thereby resisting damage to the transfer pump and/or decreasing the chances for interrupting the operation of the transfer pump.

A still further object of the present invention is to provide an apparatus used in conjunction with a transfer pump for selectively pumping radioactive fluids from a selected level in a selected range of levels from a free surface and from a bottom of a waste tank.

More particularly, the present invention provides a variable level suction device comprising a telescoping pipe assembly and an hydraulic housing which partially encases an impeller assembly and which contains suction ports which are selectively operated to allow the impeller assembly to draw liquid waste directly from the bottom of the tank or to allow the impeller assembly to draw liquid waste into the telescoping pipe assembly from a selected level, ranging from a free surface of the liquid waste to the hydraulic housing.

It is a further object of the present invention to provide a device which operates in conjunction with a submersible canned motor transfer pump to draw in liquid waste from varying levels in a waste tank, including a free surface, or to draw in liquid waste from the bottom of a waste tank.

And yet still a further object of the invention is to provide a vertically telescoping suction device which is in communication with the hydraulic end of a transfer pump, and which provides suction over approximately the full range of fluid levels in a tank, including the bottom of the tank.

BRIEF DESCRIPTION OF THE DRAWINGS

A full understanding of the invention can be gained from the following description of the preferred embodiments of the present invention when read in conjunction with the accompanying drawings in which.

DESCRIPTION OF THE PREFERRED EMBODIMENTS

Figure 1:
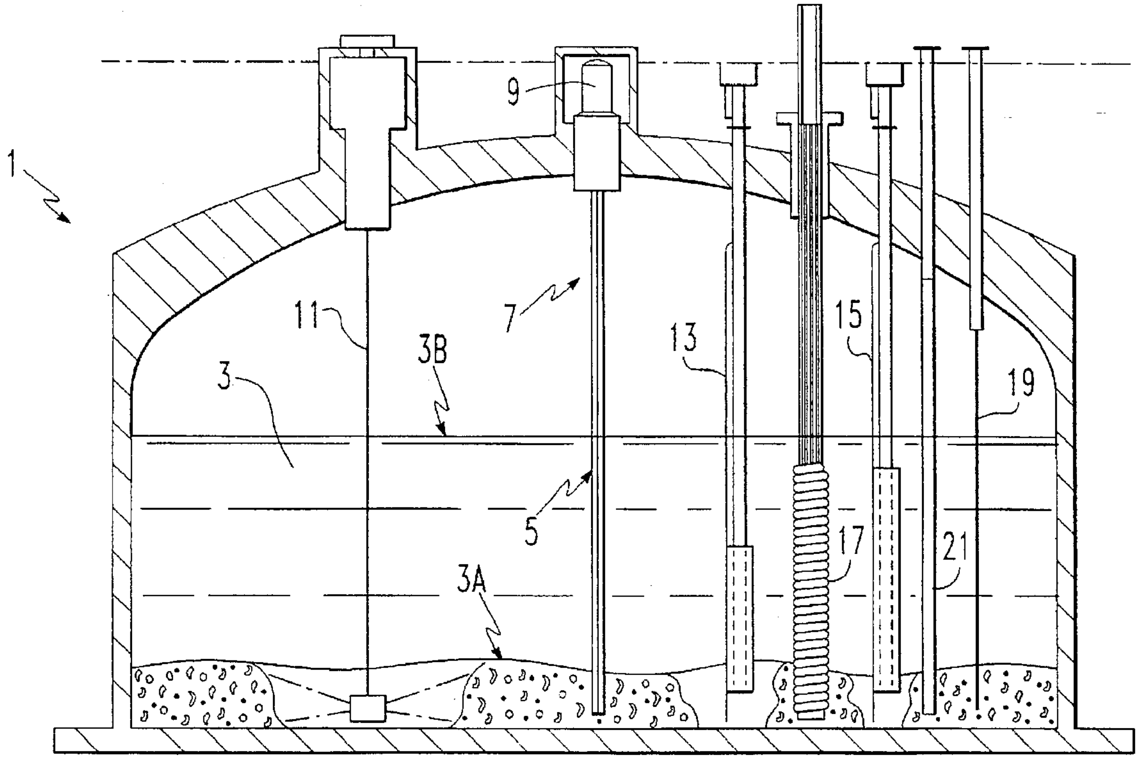
FIG. 1 PRIOR ART
FIG. 1 is a schematic of a waste tank showing the several devices including a transfer pump of the prior art having a lineshaft extending down into a waste tank.

Referring first to FIG. 1, there is shown a waste tank 1 showing the several devices used in the process for mixing and transferring or removing highly radioactive and abrasive liquid waste 3 out of tank 1, which liquid waste contains sludge 3A at the bottom of tank 1 and a liquid shown at line level 3B. These devices include a transfer pump 5 of the prior art which is installed in a waste tank 1, and which may be similar to that discussed hereinabove in that it has a lineshaft 7 and an electric motor 9 located outside waste tank 1 for driving lineshaft 7. Motor 9 is air cooled and lineshaft 7 employs 5 or more sets of bearings to support the radial loads imposed on its long shaft which may be about 45 to 58 feet long. Even though not shown, a column, filled with pressurized water, houses lineshaft 7, and requires an upper dynamic seal adjacent to motor 9 in order to maintain pressurization of the water. The pressurized water is used to lubricate the bearings of lineshaft 7. Due to its long length, lineshaft 7 generally has poor rotor dynamic performance and a very short life of only about 100 hours of operation, at which time transfer pump 5 must be removed from waste tank 1 where it is immediately placed in a concrete vault for underground burial.

Waste tank 1 may be similar to that described with regard to the transfer pumps of the prior art in that it may be approximately 60 feet deep and have a diameter ranging from about 75 to about 85 feet with liquid capacities of about 1million gallons, and the radioactive liquid waste 3 may be similar to that described for transfer pumps of the prior art.

The other devices shown in FIG. 1 include a mixer pump 11 which agitates and/or mobilizes the liquid waste 3 so that the liquid waste is able to be pumped through transfer pump 5. Further devices whose operation and function are well-known in the art include air lift circulators 13 and 15, a steam column 17, and a thermocouple tree 19 which is separated from air circulator 15 by a dry wall 21.

FIG. 1 represents a typical present-day transfer pump and has all or some of the disadvantages discussed hereinabove. The transfer pump of the present invention may replace that shown in FIG. 1.

FIGS. 2, 3A, 3B, 3C, 4, 5, 6, 7, 8, and 9 represent a transfer pump 23 of the present invention which may replace the transfer pump 5 of FIG. 1. The transfer pump 23 of the present invention may be used in waste tank 1 of FIG. 1 which tank 1 is located in the ground and contains high-level radioactive liquid waste having a gamma radiation exposure of about 300 megarads. Referring again to FIG. 1, liquid waste 3 may consist mainly of insoluble oxides/hydroxides of aluminum, iron, manganese, and zirconium in water mixtures up to 50% solids by volume. This liquid waste is to be first mixed or mobilized by mixer pump 11 and then drawn out of waste tank 1 by transfer pump 23 of FIGS. 2–9. Mixer pump 11 may be similar to that disclosed in the patent application being filed concurrently as this patent application and entitled "A Submersible Canned Motor Mixer Pump".

Figure 2:
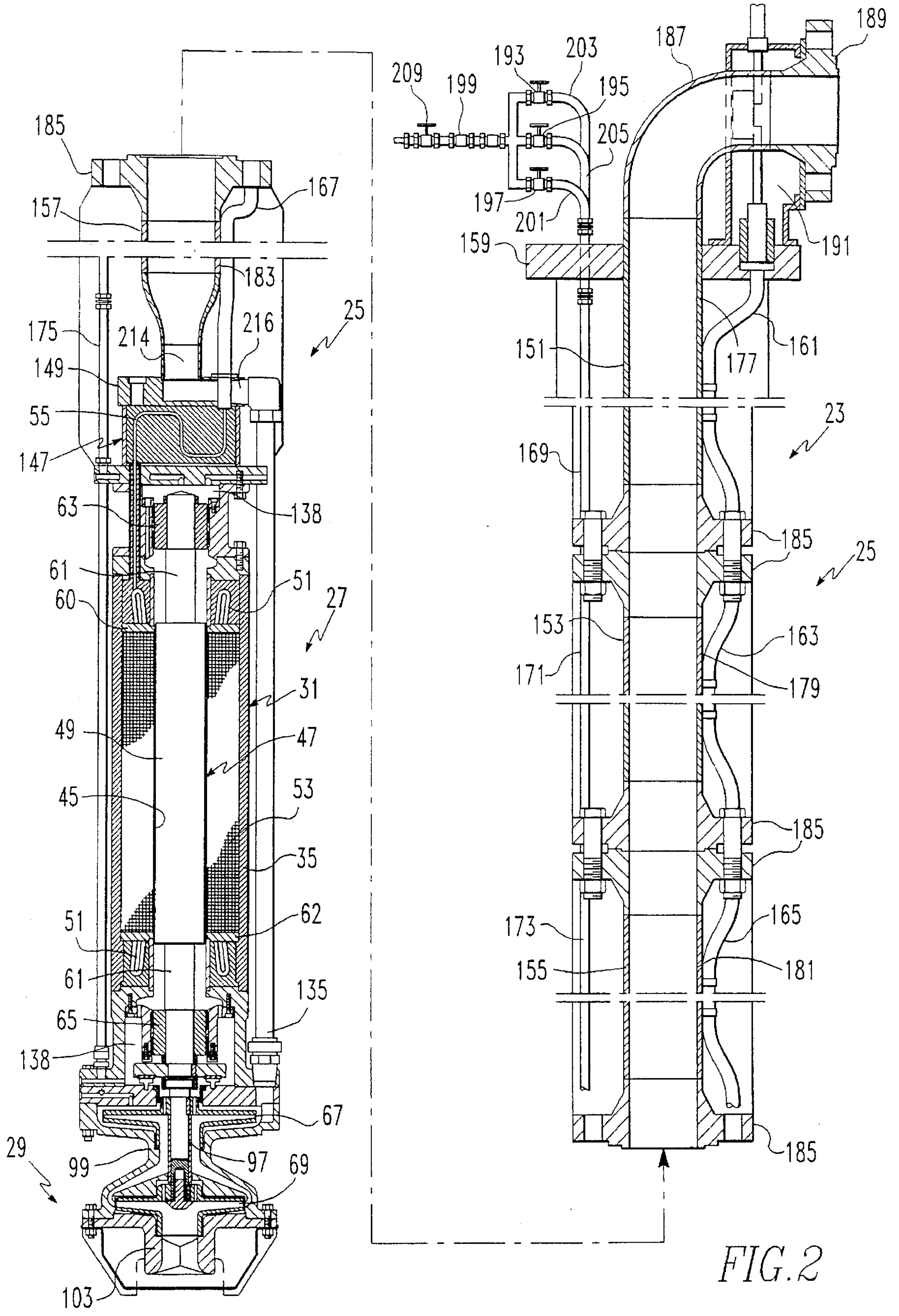
FIG. 2 is a vertical cross-sectional view of a transfer pump of the present invention.

Referring particularly to FIG. 2, transfer pump 23 of the present invention comprises a column assembly 25, motor housing means 27 connected to column assembly 25, and an impeller assembly 29 mounted to motor housing means 27.

Figure 3A:
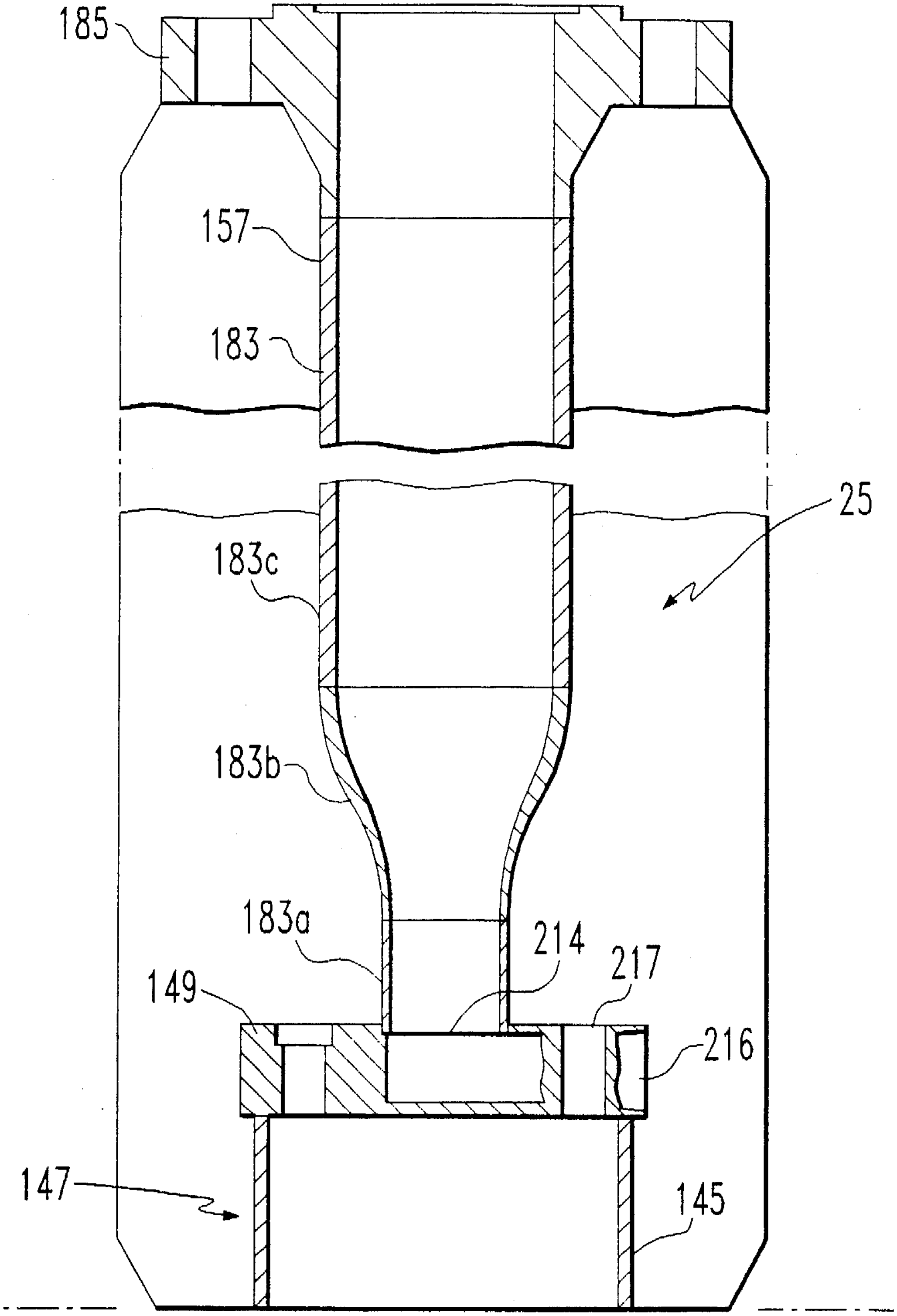
FIGS. 3A, 3B, and 3C are enlarged, cross-sectional, partial views showing the electrical motor means and the impeller assembly of FIG. 2 with some of the components removed for clarity purposes.
Figure 3B:
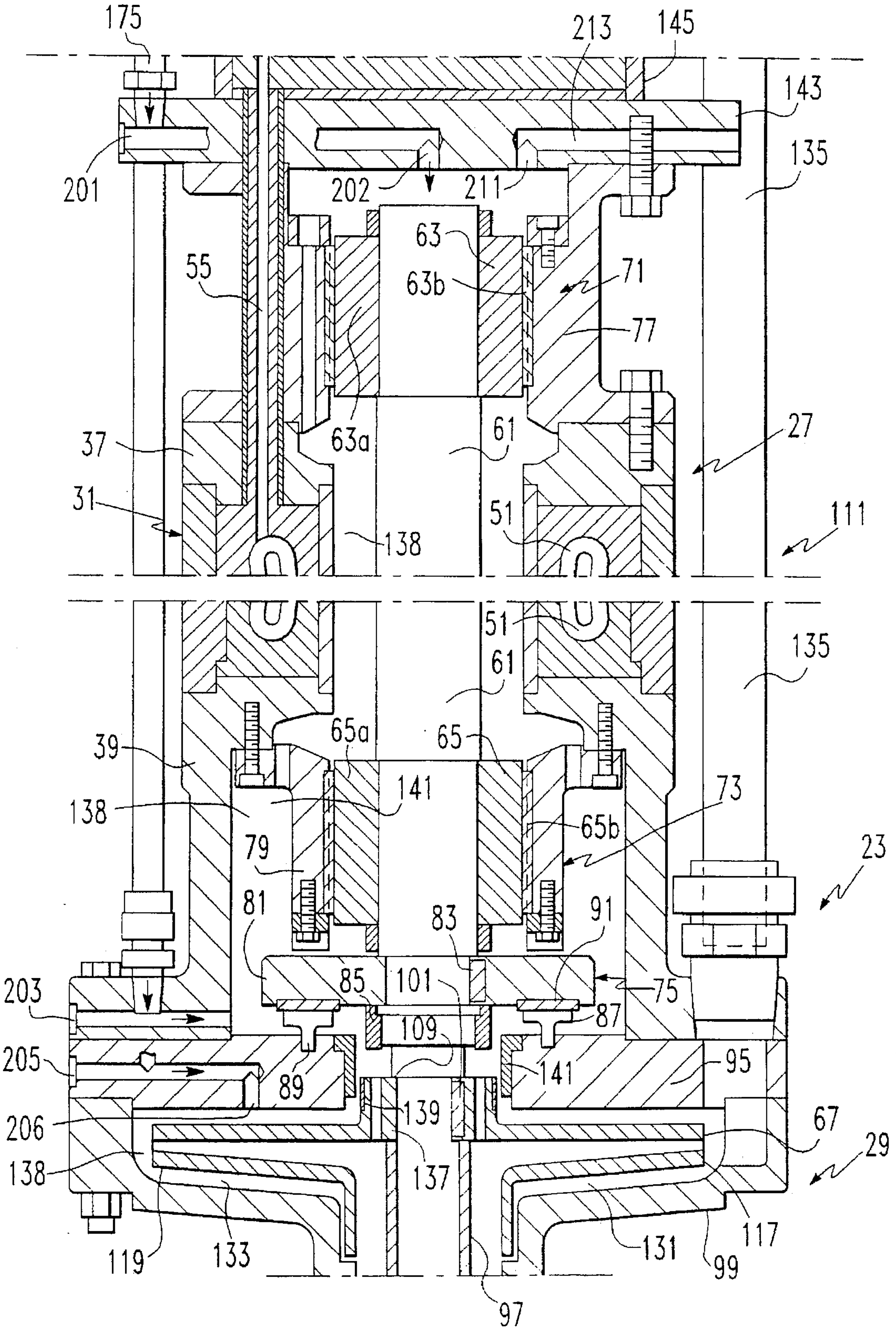
Figure 7:
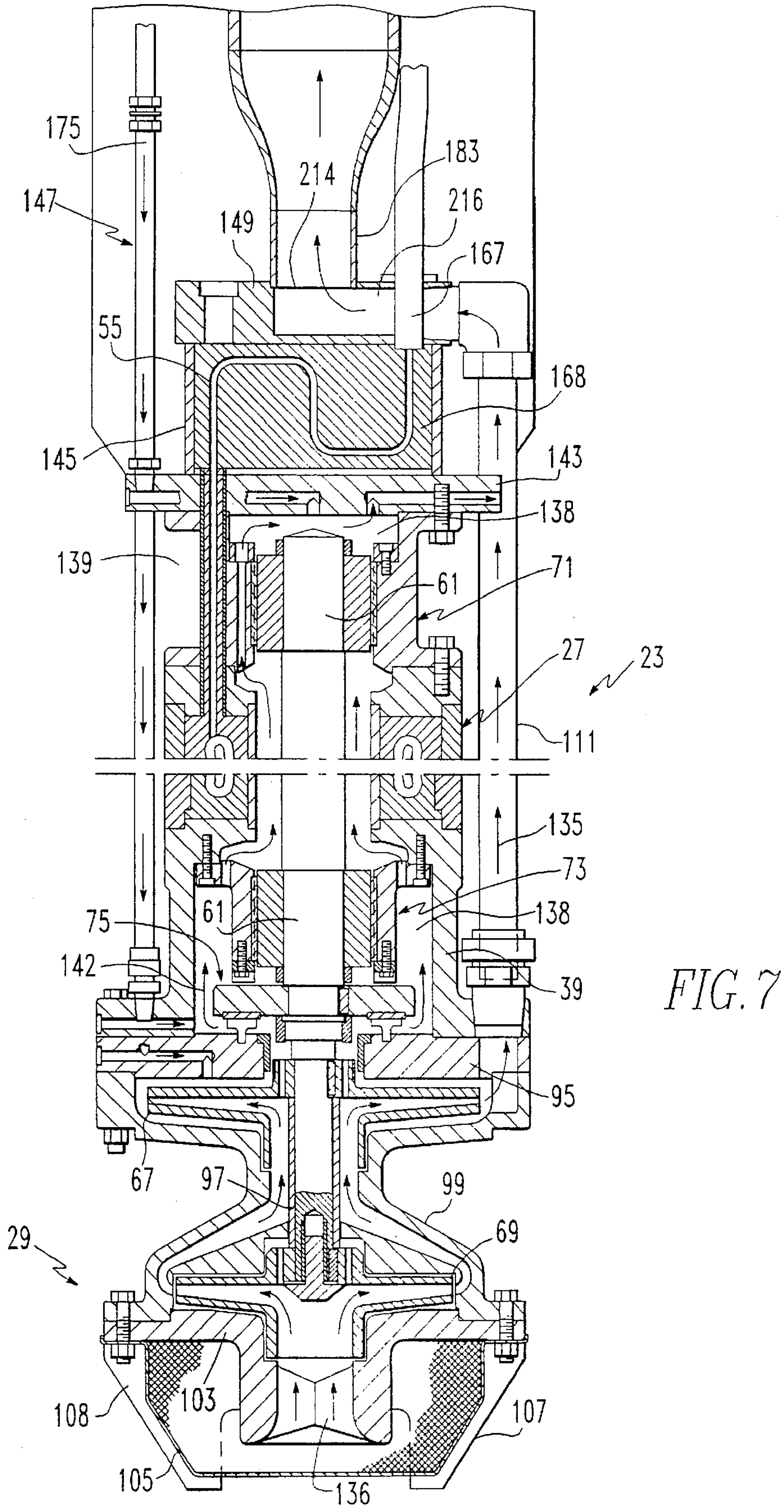
FIG. 7 is an enlarged, cross-sectional, partial view showing the flow paths for the liquid waste and for the fresh water through the impeller assembly and electric motor means.

Referring particularly to FIGS. 2, 3B, and 7, motor housing means 27 encloses an electric motor means 31 which is the driving means for transfer pump 23. As shown particularly in FIG. 4, electric motor means 31 is comprised of a stator assembly 33 having an outer annular shell 35, an upper annular closure member 37 and a lower annular closure member 39, both of which are welded as indicated at numerals 41 and 43 to annular shell 35, and an inner annular stator can 45 welded to upper and lower closure members 37 and 39 as indicated at numerals 42 and 44, respectively.

Figure 4:
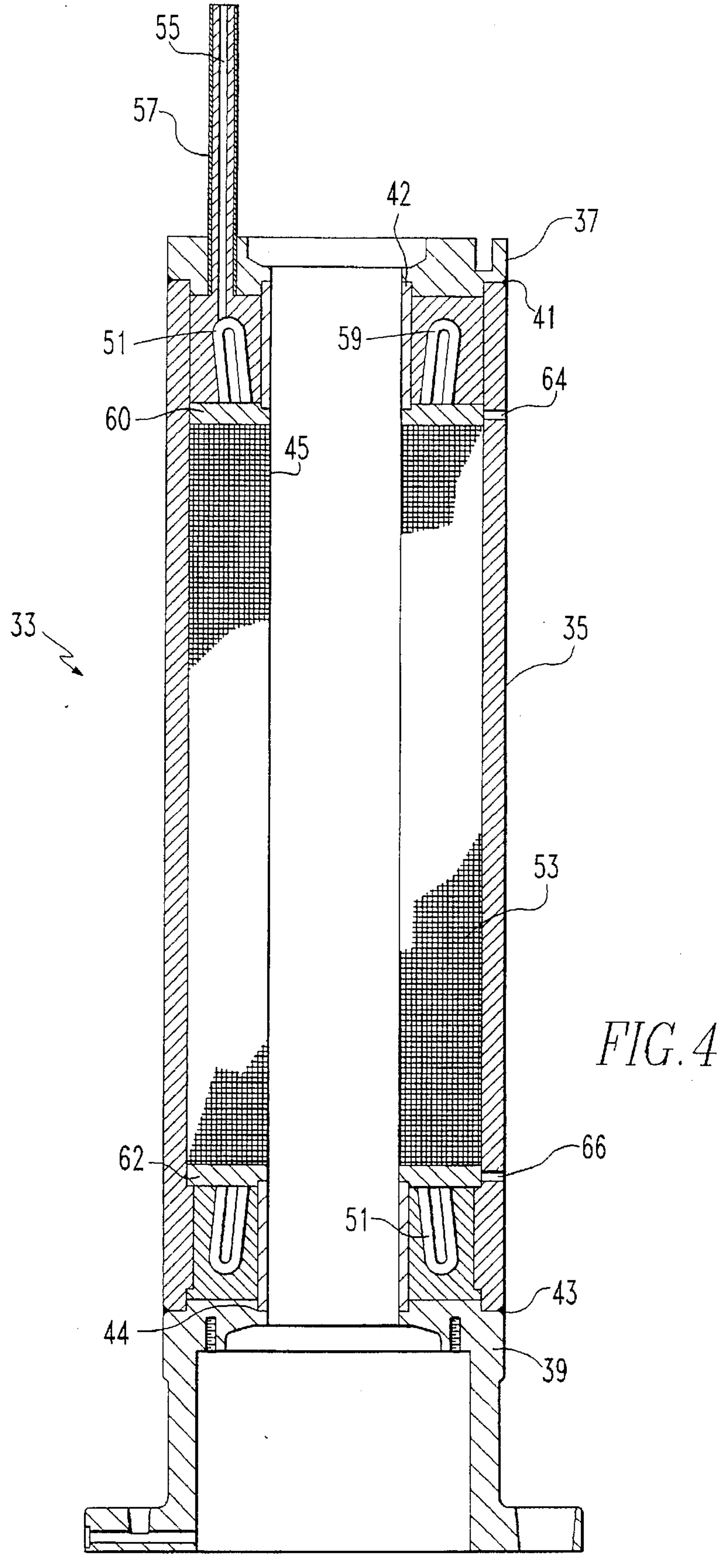
FIG. 4 is a cross-sectional, partial view showing the stator assembly of the electric motor means of FIG. 2.
Figure 5:
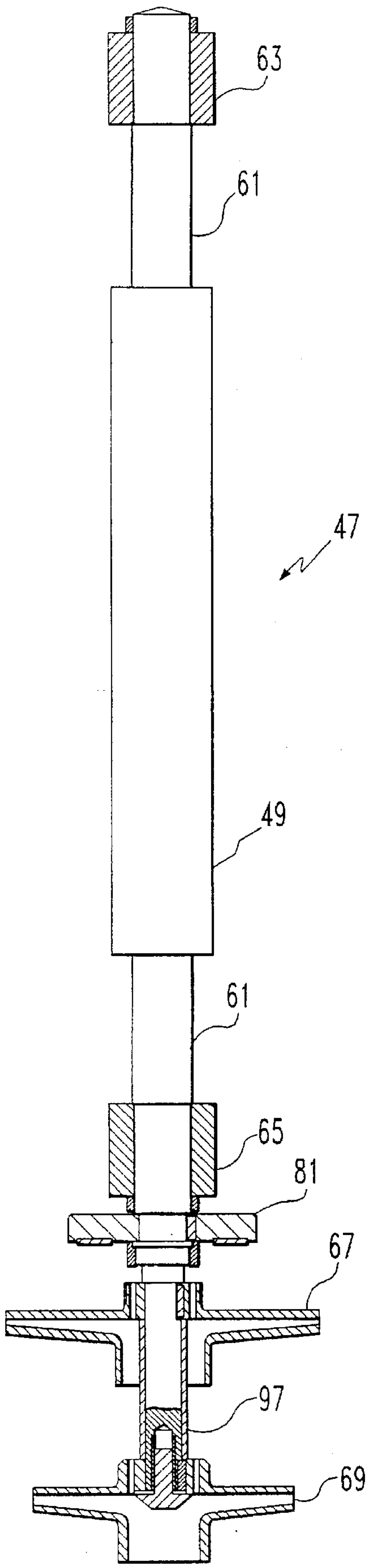
FIG. 5 is a cross-sectional, partial view showing the rotor assembly of the electric motor means of FIG. 3.

Electric motor means 31 is a "canned" motor comprising a "canned" stator assembly 33 as particularly shown in FIG. 4 and a "canned" rotor assembly 47 with a rotor can 49 as particularly shown in FIG. 5, which are well-known in the art of electric motors, and which are "canned" to prevent fluid from contacting the electrical components. The stator can 45 for stator assembly 33 of FIG. 4, and can 49 for rotor assembly 47 of FIG. 5 are made of a corrosion, resistant type of material, such as HASTELLOY® C276 which is generally a specialty steel alloy and which is available from the Cabot Corporation.

The cans 45 and 49, respectively, of stator and rotor assemblies 33 and 47 of FIGS. 4 and 5 are fitted into place and welded to their respective housing by welding after the rotor assembly 47 and the stator assembly 33 are electrically connected. Cans 45 and 49 permit the liquid waste 3 which is processed by the transfer pump 23 and which may hereinafter be referred to as the "processed fluid", to flow into the annulus formed by the canned stator assembly 33 and the canned rotor assembly 47 to cool electric motor means 31 when stator and rotor assemblies 33 and 47 are in an assembled form of FIGS. 2, 3B and 7, more about which will be discussed hereinafter.

Electric motor means 31 may be a squirrel cage induction-type motor. The stator windings 51 (FIGS. 2 and 4) may be silicon steel laminations, and the stator core 53 is randomly wound coils. The solid rotor (not shown) in rotor can 49 may use copper rotor bars and connection tings to form a squirrel cage configuration in a manner well-known in the art.

Electric motor means 31, in this particular application, is preferably a 2-pole machine which may operate at about 3206 revolutions per minute with 460 volts, with three phase, 60 Hertz power supply. Electric motor means 31 may have a different number of poles and other speeds for other applications.

Shown best in FIG. 4, the electrical power supply to electric motor means 31 is supplied to the stator assembly 33 by means of a power cable 55 which extends through a power lead tube 57 welded in upper annular closure member 37.

As particularly shown in FIG. 4, can 45 and outer shell 35 for stator assembly 33 form an annular cavity 59 in which stator windings 51 and core 53 are contained. In order to improve the heat transfer from the end turns of stator windings 51 and to prevent the entry of air or moisture into annular cavity 59, annular cavity 59 is completely potted from finger plates 60 and 62 to upper closure member 37 and lower closure member 39, respectively, with a sand-silicon varnish mixture which is generally baked around the windings 51 to form a hard, the thermally conductive solid. Finger plates 60 and 62 are fixed to outer shell 35 by anti-rotation pins 64 and 66, respectively. Finger plates 60 and 62 compress the punchings of core 53 together and are welded to the punchings or are otherwise attached and the anti-rotation pins 64 and 66 prevent core 53 from turning when electric motor means 31 is engaged. The stator assembly 33 is adequately cooled by the processed fluid passing over the outside surface of the stator can 45.

The typical insulation of stator core 53 and the potting in stator cavity 59 form an insulation system for electrical motor means 31, which is considered by the inventors to be adequate for a radiation exposure of 300 megarads caused by the liquid waste in tank 1 which is expected to have over a 10 year operating life for transfer pump 23.

The insulation system has been tested to a radiation level of 1000 megarads, and has shown no significant reduction in electrical performance of electric motor means 31. The insulation for core 53 may also be mica or glass.

For testing purposes, the electric motor means 31 was sized for operation in both water and in the liquid waste, and it was found that, in general, with the exception of the stator can 45 and rotor can 49 and fluid effect losses, the expected motor losses were similar to those found in air-cooled motors. Electrical losses occur in both the stator can 45 and the rotor can 49 due to the generation of eddy currents from the magnetic fields. Additional fluid and friction losses are created by the operation of rotor assembly 47 in a highly viscous fluid instead of air. The design of electric motor means 31 preferably is based on the highest specific gravity and the highest viscosity of the fluid which can be identified in waste tank 1.

Referring now to FIGS. 2 and 5, and particularly FIG. 5, the rotor assembly 47 of electric motor means 31 is comprised of a rotor (not shown) in can 49, shaft 61 extending through and from rotor can 49, journals 63 and 65 connected on the ends of shaft 61, an upper impeller 67 connected on shaft 61, and a lower impeller 69 mounted on the end of shaft 61.

The rotor (not shown) in rotor can 49 of the rotor assembly 47, preferably, is magnetic with slots machined in the rotor for the rotor bars. As discussed hereinabove, the rotor, preferably, has copper bars and end rings brazed together to form the traditional type of squirrel cage rotor assembly. Rotor can 49 is welded to shaft 61 to hermetically seal and isolate the squirrel cage components of the rotor from the processed fluid. The rotor components in rotor can 49 are cooled by the processed liquid flowing over shaft 61 and into the clearance between the stator can 45 and the rotor can 49, more about which will be discussed hereinafter.

Referring particularly to FIG. 3B, both the upper and lower ends of shaft 61 include the journals 63 and 65, respectively. Upper journal 63 includes a radial bearing assembly 71, and lower journal 65 includes a radial bearing assembly 73 and a thrust bearing assembly 75.

Journals 63 and 65 are, preferably, made of a hard material, such as tungsten carbide, and constitute rotating bearing members *63a*, *65a* with bearing surfaces for radial bearing assemblies 63 and 65, respectively. Journals 63 and 65 are slotted on their ends, and each journal is secured axially and radially to shaft 61 by a tabbed retaining ring (not shown) which is shrunk onto and pinned to shaft 61.

Radial bearing assemblies 71 and 73 as best shown in FIG. 3B further include a stationary bearing member *63b* and *65b*, respectively, which run against the bearing members *63a*, *65b*of journals 63 and 65, respectively, on rotor shaft 61 and which bearing members *63b* and *65b* are mounted in an annular housing 77 and 79, respectively. Preferably, static bearing members *63b*, *65b* are made of a hard material, such as tungsten carbide and undergo a shrink fit process for mounting thereof on annular housings 77 and 79, respectively.

The bearing span formed by journals 63 and 65 and the bearing members *63a*, *63b*, *65a*, and *65b* for radial bearing assemblies 71 and 73 are relatively short, thus the required alignment for these two bearing assemblies 71 and 73 can be controlled by the manufacturing process, and consequently no self-alignment feature for bearing assemblies 71 and 73 is required. That is, the tolerances placed on bearing members *63a*, *63b*, *65a*, and *65b* limit the angular misalignment between these members when the outer diameter, the inner diameter, and the concentricity of these bearing members are controlled. The configuration and length of journals 63 and 65 and the arrangement of static bearing members *63b* and *65b* with rotating bearing members *63a*and *63b* create a fluid-film riding and self-lubricating bearing assembly for radial bearing assemblies 71 and 73, which eliminate the need for any rotating seals, any contacting bearings, and/or any separate lubrication systems, which generally are necessary for the radial bearing assemblies of the prior art, more about which will be discussed hereinbelow.

Figure 8:
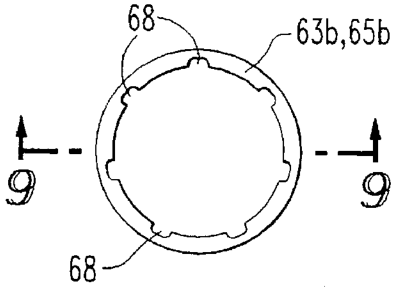
FIG. 8 is a plan view of the outer static bearing members for the radial bearing assemblies.
Figure 9:
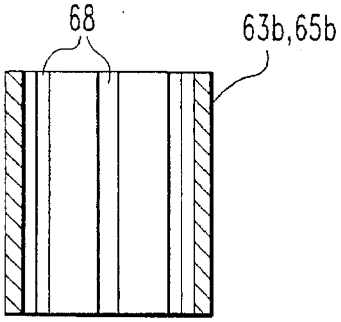
FIG. 9 is a cross-sectional view of the outer bearing members taken along line 9—9 of FIG. 8.

As shown in FIGS. 8 and 9, static bearing members *63b* and *65b* have axial slots 68 which allow the process fluid to flow and push the solid waste particles of the liquid waste in tank 49 of FIG. 1 which are larger than the radial clearances between bearing members *63b* and *63b* and between bearing members *65a*and *65b* to be ground up in the slots 68 and thereafter to pass through and out of radial bearing assemblies 71 and 73. As shown in FIG. 9 these slots 68 are located in the inner surface of static bearing members *63b* and *65b* and are axial grooves therein. Preferably, for this particular application, the depth of axial slots 68 is less than the clearance or annulus formed by stator can 45 and rotor can 49. The depth of slots 68 is about 0.14 inches and its width is about 0.35 inches. Preferably, bearing members *63a* and 65*a* have a continuous inner surface along their length. Slots 68 may be helical or skewed grooves or any other desirable configuration, even though they are shown as being axial or longitudinal in FIG. 9.

As best shown in FIG. 3B, upper annular housing 77 is bolted to upper closure member 37, and lower annular housing 79 is bolted to lower closure member 39. Annular housings 77 and 79 of radial bearing assemblies 71 and 73, respectively, are preferably, made of stainless steel.

Located adjacent to journal 65 of lower radial bearing assembly 73 and mounted on shaft 61 is thrust bearing assembly 75. Thrust bearing assembly 75 is comprised of a thrust runner 81 which is secured radially to rotor shaft 61 by a key 83, and which is secured axially to shaft 61 by a thrust runner nut 85. Thrust bearing assembly 75 is further comprised of thrust shoes, indicated at numerals 87 and 89 in FIG. 3B, more about which will be discussed hereinbelow.

Thrust runner 81 is preferably made of stainless steel and contains a continuous ring 91 located on its undersurface, as particularly shown in FIG. 3B, and which run against the thrust shoes 87 and 89, respectively. This bearing member 91 of thrust runner 81, as well as thrust shoes 87 and 89, is preferably, made of a hard material, such as tungsten carbide or silicon carbide. Ring bearing member 91 is attached to the undersurface of thrust runner 81 through a shrink fit process. Thrust shoes 87, 89 are mounted in a lower end plate 95 which is bolted to lower annular closure member 39, shown best in FIG. 3B. As in the case of radial bearing assemblies 71 and 73, the manufacturing process of thrust shoes 87 and 89 and thrust ring bearing member 91 of thrust bearing assembly 75 through appropriate tolerances control the bearing alignment without the need for self-alignment of thrust bearing assembly 75 such that any angular misalignment at the thrust bearing assembly 75 is acceptable.

The hard-on-hard radial bearing assemblies 71 and 73, as discussed hereinabove, preferably employ axial slots in static bearing members **63*b*, 65*b* which extend on the inner surface thereof along their respective lengths as particularly shown in FIGS. 8 and 9 and which allow the larger particles of the liquid waste which enter the radial bearing assemblies 71 and 73 to be ground down into smaller particles and/or to be flushed out by the process liquid without damaging any components of transfer pump 23**.

The type of material, which is tungsten carbide, but which also could be silicon carbide, for the bearing components of radial bearing assemblies 71 and 73 and thrust bearing assembly 75 is considered by the inventors as being compatible with the high pH chemistry of the liquid waste, is generally highly abrasive resistant, and therefore, is generally suitable for the type of liquid waste in which the transfer pump 23 of the present invention is employed in that the liquid waste 3 has a high viscosity and is highly abrasive.

Radial bearing assemblies 71 and 73 and thrust bearing assembly 75 are film riding, hydrodynamic bearings which utilize the liquid waste 3 of tank 1 which waste 3 is pumped through electric motor means 31 for cooling and/or lubrication of bearing assemblies 71, 73, 75. The viscosity of the liquid waste 3 is between about 1.0 to 30.0 centipoise and more than adequately supports the applied operating and seismic loads of the transfer pump 23, which loads are caused by the hydraulic and electrical forces and the forces between the stator can 45 and the rotor can 49, and which forces are accounted for in sizing the bearings. For testing purposes, bearing assemblies 71, 73 and 75 have also been operated in water which has a viscosity substantially lower than that of the liquid waste 3. It has been found that the bearing film thickness created by and between the bearing members **63*a*, 63*b*, 65*a*, and 65*b* of radial bearing assemblies 71 and 73, and the bearing members 87, 89, and 91 of thrust bearing assembly 75 supported the applied operating loads of transfer pump 23. Since the viscosity of the liquid waste 3 in tank 1 is greater than water, the bearing film thicknesses which will be created by and between radial bearing assemblies 71, 73 and thrust bearing assembly 75 when transfer pump 23** is in operation will be much greater than the bearing film thicknesses realized in water.

Referring again to FIGS. 2, 3B, 3C and 5, located adjacent to thrust bearing assembly 75 and mounted on rotor shaft 61 and partially extending into lower end plate 95 is impeller assembly 29. Impeller assembly 29 essentially comprises an upper impeller 67, an impeller spacer 97, lower impeller 69, a diffuser casing 99 which forms first and second stage diffusion areas with impellers 67, 69, a suction adapter 103, an inlet screen 105, and support fins, two of which are indicated at numerals 107 and 108 in FIG. 3C.

Referring particularly to FIG. 3B, upper impeller 67 is a second stage impeller which is keyed by key 101 to shaft 61 to prevent rotation relative to shaft 61 and which is located axially on shaft shoulder 109. Upper impeller 67 is secured in place against shaft shoulder 109 by impeller spacer 97. Upper impeller 67 has about six vanes, two of which are indicated at numerals 117 and 119 in FIG. 3B, and preferably, is a stainless steel casting. Upper impeller 67 is larger in diameter than lower impeller 69. The diameter of upper impeller 67 is such that it accounts for the hydraulic losses associated with the dumped diffusion casing 99 and the vertical discharge pipe assembly 111, shown best in FIG. 3B.

Figure 3C:
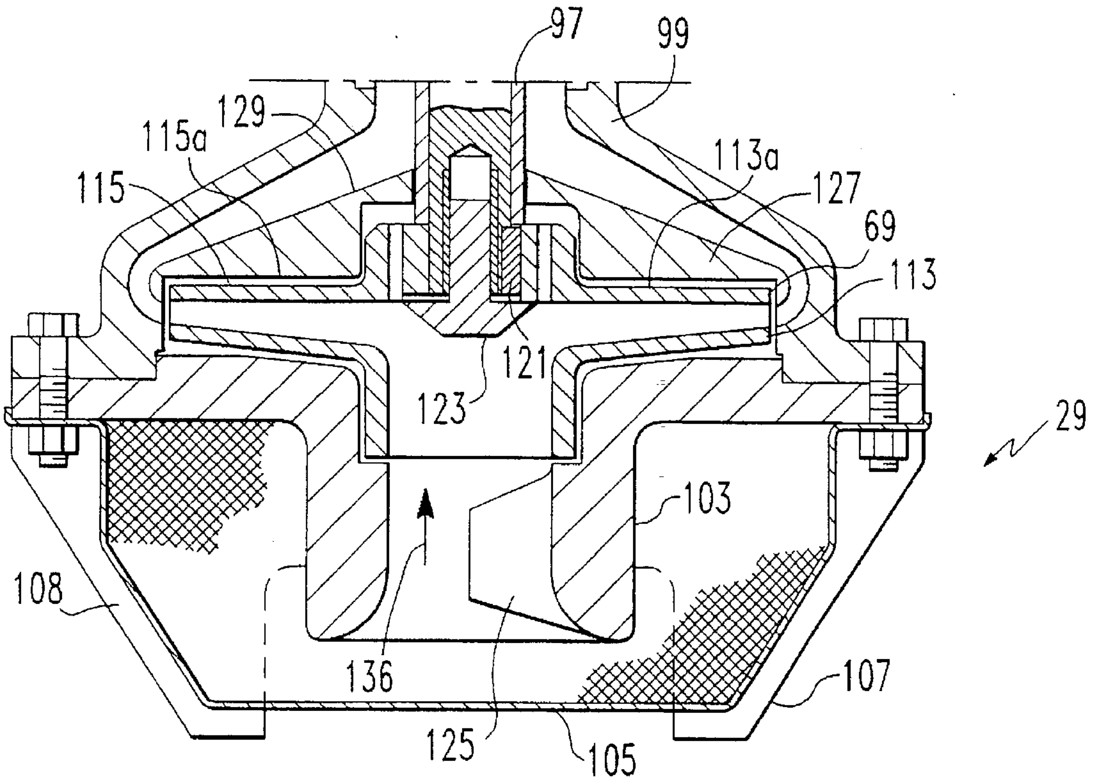

Referring particularly to FIG. 3C, lower impeller 69 has about six vanes, two of which are indicated at numerals 113 and 115, and preferably, is a stainless steel casting. Lower impeller 69 is keyed by key 121 to shaft 61 to prevent relative rotation therebetween, is secured on shaft 61 by way of impeller bolt 123, and is spaced axially from upper impeller 67 along shaft 61 by way of impeller spacer 97.

The upper shroud of the vanes 113 and 115 of lower impeller 69 indicated at numerals **113*a* and 115*a* in FIG. 3C is located less than 6 inches from the inlet of suction adapter 103 of impeller assembly 29. This insures that transfer pump 23 of the present invention is able to empty waste tank 1 of FIG. 1 to below a six inch liquid waste level in tank 1** since it is necessary for the impeller to be completely covered by the liquid in order for it to be able to pump the liquid waste.

Still referring particularly to FIG. 3C, suction adapter 103 is bolted to casing 99 and preferably is a stainless steel casting. The inlet of suction adapter 103 is in the form of a suction bell and contains an anti-vortex fin 125 which is an integral part of the suction adapter 103.

Bolted to suction adapter 103 are fins 107 and 108. Preferably, four such fins are radially arranged around the inlet of suction adapter 103, for supporting inlet screen 105. These radial fins 107 and 108 of FIG. 3C act as guides for transfer pump 23 when transfer pump 23 is installed into the liquid waste, and act to reduce vortexing of the liquid waste when transfer pump 23 is operated at low liquid waste levels in tank 1 of FIG. 1. That is, at low levels the liquid waste tends to swirl and the vanes or fins 107 and 108 counteract the whirlpool or swirling effect.

Inlet screen 105 has a mesh which is sized to prevent entry of the solid particles of the liquid waste which could damage and/or block the pump hydraulics. The flow area of inlet screen 105 is large so as to minimize the head losses across inlet screen 105, and to minimize the velocity of the liquid waste being drawn up into the suction adapter 103.

In a manner well-known in the art, a sparge ring (not shown) is located at the bottom of suction adapter 103 to back flush the inlet screen 105 and to disperse any heavy sludge from the suction area of suction adapter 103 which may be picked up in this area when transfer pump 23 is being installed into tank 1, and more about which will be discussed hereinbelow.

Still particularly referring to FIG. 3C, diffuser casing 99 of impeller assembly 29 is preferably made of a stainless steel casting and is bolted to lower annular plate 95. The upper part of casing 99 acts as a second stage dumped diffusion casing and is formed to create a static hydraulic system for the liquid waste being pumped into transfer pump 23 in that it leads to discharge pipe 135 shown in FIG. 3B.

The first stage diffuser area of casing 99 has about 8 vanes, two of which are indicated at numerals 127 and 129 in FIG. 3C. These vanes turn the flow of the liquid waste from the lower impeller 69 into the upper impeller 67.

As shown in FIG. 3B, the upper part of casing 99 has radial discharge areas, two of which are indicated at numerals 131 and 133. Even though only radial discharge areas 131 and 133 are shown in FIG. 3C, it is to be appreciated that, preferably, four such discharge areas are provided and are arranged radially relative to shaft 61 and 90° apart relative to each other.

These discharge areas 131 and 133 along with the vanes 117 and 119 of upper impeller 67 turn the flow of the liquid waste axially relative to shaft 61 into several vertical discharge pipes of discharge assembly 111, one of which vertical discharge pipes is indicated at numeral 135 in FIGS. 2 and 3B.

The dumped diffusion casing 99 of impeller assembly 29 is somewhat different than the conventional liquid waste diffusers of a lineshaft type of transfer pumps of FIG. 1. First, the axial length of casing 99 is less, resulting in an increase for the critical speed of electric motor means 31 and secondly, casing 99 has fewer diffuser vanes and passages than the conventional type of diffuser of the transfer pump 5 of the prior art, thereby drastically reducing the need for inspection and decontamination of the system.

Referring again to FIG. 3B, an impeller hub 137 of upper impeller 67 has a tungsten carbide ring 139 around its outer periphery, and lower end plate 95 has an annular opening with an inner tungsten carbide ring 141. Rings 139 and 141 cooperate with each other to act as a "grinder" for the large particles in the processed fluid of liquid waste 3, more about which will be discussed hereinafter.

Referring particularly to FIG. 7, the processed liquid waste flows through the several components of transfer pump 23 as shown by the arrows pointing upwardly with respect to FIG. 7 and one of which arrow is indicated at numeral 136 in suction adapter 103. Immediately above thrust bearing assembly 75 is a motor cavity 138 formed by lower end plate 95 and an upper end plate 143, through which the processed liquid waste flows as indicated by the several arrows, one of which is numbered 142.

As best shown in FIG. 3B, upper end plate 143 which is, preferably, made of stainless steel, is welded to a ring 145. As shown best in FIG. 3A, ring 145 is part of a cap assembly 147 which further consists of an annular support plate 149. Annular support plate 149 is welded to ring 145 and column assembly 25.

Figure 6:
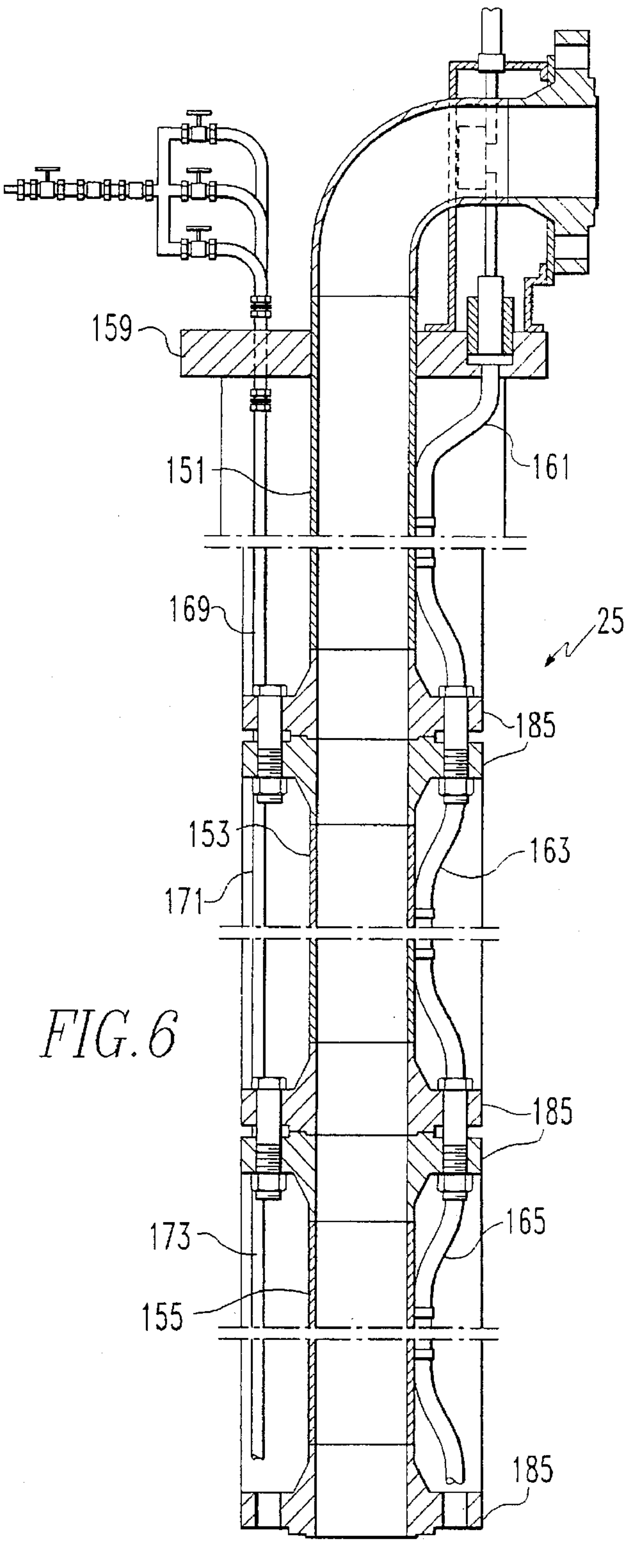
FIG. 6 is an enlarged, cross-sectional, partial view showing the upper portion of the transfer pump of FIG. 2.

Referring particularly to FIGS. 2, 3A, and 6, column assembly 25 consists of several modular cylinder sections 151, 153, 155, and 157, which are bolted together to suspend transfer pump 23 from a mounting plate 159 on top of waste tank 1. Each of these cylinder sections 151, 153, 155, and 157, as shown to the right of column assembly 25 in FIGS. 2, 3A, and 6 supports and carries a conduit 161, 163, 165, and 167 (FIG. 2), respectively. These conduits 161–167 form a continuous passageway for electrical leads into electric motor means 31. As shown to the left of column assembly 25, each cylinder section 151–157 supports and carries a conduit 169, 171, 173, and 175 (FIG. 2), respectively, which forms a purge line with a continuous passageway for delivering fresh water into motor cavity 138 (FIG. 2). As particularly shown in FIG. 2, each cylinder section 151, 153, 155, and 157 has a pipe section 177, 179, 181, and 183, respectively, each of which sections 177–183 are made, preferably, of stainless steel, has a length of less than 8 feet, and a thickness of about 4 inches. Each pipe section 177, 179, 181, and 183 form a continuous passage for the flow of the liquid waste from impeller assembly 29 up into column assembly 25.

Each cylinder section 151–157 has a flanged end 185 at their end or ends such that adjacent flanged ends 185 for cylinder sections 151–157 can be bolted together as shown in FIGS. 2 and 6 to form the vertical structure of column assembly 25. The flanged ends 185 can be bolted together without the need for any seals therebetween since the amount of leakage of the liquid waste back into waste tank 1 is minimal and of no consequence.

The number of modular cylinder sections similar to sections 151–157 depends upon the insertion length required for a specific transfer pump application. This modular construction for column assembly 25 facilitates the disassembly, decontamination, and inspection process for transfer pump 23 since these modular sections 151–157 can easily be removed and replaced with minimum radiation exposure to the workmen.

The electrical conduits 161–167 and the purge water conduits 169–175 are supported at the flanged ends 185 of modular sections 151–157 and are selected at axial locations on either side of pipe sections 177–183 to minimize vibration thereto and are restrained within the flanged ends 185 by passing them through slots (not shown) in flanged ends 185 and by using hold down straps (not shown) between the flanged ends 185.

Mounting flange 159 is part of modular cylinder section 151 and is welded to pipe section 177 which, in turn, is welded to a curved discharged pipe section 187. This discharge pipe section is a 90° elbow pipe with a flange 189 at its terminus.

To ensure that the flanged ends 185 can support the handling, operating, and seismic loads in the system, radial gussets (not shown) can be welded to the pipe sections 177–183 and to mounting plate 159. Preferably, the several components described hereinabove for column assembly 25 are made of stainless steel.

As seen, particularly in FIG. 2, electrical conduit 161 and purge conduit 169 extend through mounting plate 159. A top mounting plate 159 is a terminal box 191 for connecting the electrical leads to electrical motor means 31. Preferably, terminal box 191 is explosive proof and is watertight and approved by the National Electrical Manufacturing Association.

Mounting plate 159 carries purge water line connection joints 193, 195, and 197 which, in turn, are connected to a fresh water supply system through a main header system 199.

Referring to FIGS. 2, 3B, and 7, connection joint 197 is connected to water conduits 169–175 which feed water into motor cavity 138 and onto upper radial bearing assembly 71 as shown at numeral 201 in FIG. 3B.

Referring to FIGS. 2 and 3B, connection joints 193 and 195 are connected to conduits similar to conduits 169–175 for forming a second and a third purge line 203, 205, respectively. As shown particularly in FIG. 3B, the second purge line 203 directs fresh water into motor cavity 138 and onto lower radial assembly 73 and thrust bearing assembly 75. The third purge line 205 directs fresh water into the area just above upper impeller 67. Purge feed line 201 includes a radial port which runs into an axial port 202 of upper end plate 143. Feed line 203 is a radial port in lower annular closure member 39, and purge feed line 205 is a radial port which runs into an axial port 206 in lower end plate 95.

Referring to FIG. 2, purge feed lines 201, 203, 205 are controlled by shutoff valves. The feed for purge lines 201, 203, 205 into the header system 199 includes check valves (shown) arranged in series which prevent the back flow of the process liquid waste into the fresh water system from waste tank 1. A main shutoff valve 209 is located ahead of the check valves.

The three purge feed lines 201, 203 and 205 can be used to flush the process fluid out of transfer pump 23 either immediately after the transfer pump is shut down, or after an extended layup for the transfer pump, and/or immediately prior to removing the transfer pump from waste tank 1. Feed line 205 into the hydraulics of impeller assembly 29 flushes the liquid waste off of the upper shroud of upper impeller 67. Purge feed lines 201 and 203 can also be used for a short period of time during the start of motor means 31 to deliver the initial flow of fresh water to radial and thrust bearing assemblies 71, 73, and 75 until the hydraulics of impeller assembly 29 pumps the process liquid up into motor cavity 138 for cooling and lubricating the bearing assemblies 71, 73, and 75. The water supply in purge feed lines 201, 203, and 205 may be delivered at about a pressure of 90 psig for 10 gpm of water. Purge feed lines 201, 203, and 205 are used to provide fresh water to the transfer pump 23 in order to remove particles of the liquid waste out of the internals of electric motor means 31 during operation of pump 23 and its removal from tank 1.

One of the major objects of the present invention is to process the liquid waste in tank 1 and to use the head generated by the hydraulics of impeller assembly 29 to pump the processed liquid to cool electric motor means 31 and to cool and/or lubricate radial bearing assemblies 71 and 73 and thrust bearing assembly 25. As discussed hereinabove, the liquid waste contains highly radioactive materials containing up to 50% solids by volume, with particle sizes up to about 0.040 inches. FIG. 7 illustrates the internal flow path for the liquid waste. The liquid waste is suctioned up through suction adapter 103 where the mesh size of inlet screen 105 is such as to prevent the entry of particles which could damage or block the pump hydraulics. The impeller assembly 29 is a two stage, centrifugal pump which delivers about 100 gallons of liquid waste per minute at 300 feet of head at discharge flange 189 of FIG. 2. As FIG. 7 shows by the arrows, the liquid waste flows through discharge pipe 135 of discharge assembly 111 into pipe sections 183, 181, 179, and 177 and out of pipe section 187 and discharge flange 189. As shown by the arrows in FIG. 7, some of the liquid waste is circulated through the bearing assemblies 71, 73, and 75 and electric motor means 31. Upper impeller 67 acts as a cyclone separation in that it centrifuges the larger heavier particles outward with the mainstream liquid flow through the discharge pipe 135 of discharge assembly 111. The smaller, lighter particles which spiral inwardly against the centrifugal spinning action of impeller 67 and into cavity 138 are either ground up in the annular gap formed by the two tungsten carbide rings 139 and 141 on the impeller hub 137 and lower end plate 95, respectively, or pass safely through electric motor means 31. The radial gap between rings 139 and 141 is, preferably, about 0.125 inches and acts to reduce the size of particles greater than 0.125 inches in diameter to less than the radial clearance between rotor can 49 and stator can 45, which may be about 0.150 inch, and to less than the dimensions of the axial slots 68 in bearing member *65b* of lower radial bearing assembly 73, which axial slots 68 may measure about 0.140 inches deep and 0.32 inches wide. Since the particles are reduced to less than 0.125 inch they can easily be passed with the liquid waste flow through the bearing surfaces of both thrust bearing assembly 75 and lower radial bearing assembly 73 and up into the radial clearance between stator can 45 and rotor can 49, or are further ground down by the hard-on-hard bearing surfaces of thrust bearing assembly 75 and lower radial bearing assembly 73, or are passed through the axial slots 68 of the bearing member *65b* of upper radial bearing assembly 71.

Referring particularly to FIG. 7, after the processed liquid waste flows out of the radial clearance between stator can 45 and rotor can 49 it flows into the upper part of motor cavity 138 to cool the upper radial bearing assembly 71. The processed liquid waste then flows out of axial port 211 and radial port 213 in upper end plate 143, and back into waste tank 1. The several arrows in FIG. 7 in the upwardly direction show the flow path for the processed liquid waste.

Referring again particularly to FIGS. 2 and 3A, and to cap assembly 147, annular support plate 149 has several radial channels, one of which is shown at numeral 216, which converge into an axial opening indicated at numeral 214 at the top of plate 149. Welded to plate 149 and communicating with each axial opening 214 is pipe section 183 of flanged cylinder section 157 of column assembly 25. Pipe section 183 has a lower reduced section *183a*, a transition section *183b*, and an enlarged section *183c*. The reduced section *183a* may have about a 2 inch diameter, and enlarged section *183c* may have about a 4 inch diameter. Each of the radial channels 216 are in communication with vertical discharge pipe 135 of discharge assembly 111. The liquid waste which exits impeller assembly 29, flows through the several discharge pipes 135, into radial ports channels 216, into pipe section 183, and through the remaining components 181, 179, 177, 187, and 189 of column assembly 29.

As shown best in FIG. 7, a hermetically sealed connection port 217 in support plate 149 feeds power cable 55 extending through conduits 161, 163, 165, and 167 to electrical motor means 31. Potting 168 is provided between end plate 143 and support plate 149 in order to minimize air and/or moisture into power cable 55. This potting may be a mixture of silicone, rubber and other suitable components which produce (vulcanize) solid rubbers at room temperatures, as is well-known in the art.

With reference to FIG. 2, an overall length of transfer pump 23 from the bottom of suction adapter 103 to the top of flanged end 185 of cylinder section 157 is, preferably, less than 8 feet, which length facilitates the disassembly, decontamination, and inspection of the lower working end of transfer pump 23. The motor housing 27 along with cap assembly 147, cylinder section 157 at its upper end and impeller assembly 29 at its lower end when referring particularly to FIG. 2 is easily bolted to and removed from the remaining components of column assembly 25. Also, impeller assembly 29 can be easily unbolted from motor housing 27 and removed in pieces for easy handling. The length of column assembly 25 can be changed by adding or removing a pipe section similar to pipe sections 151, 153, and 155 any place along column assembly 25. Preferably, pipe section 157 remains fixed to motor housing 27, while a pipe section is added or subtracted between any of the other pipe sections 151–155. The removing, replacing, or adding of pipe sections 151–155 enables the overall length of transfer pump 23 to be changed with minimum radiation exposure to the workmen. The stator can 45 and the rotor can 49 are welded cans which prevent the entry of radioactive material into the motor windings. This simplifies the inspection and decontamination process of the entire electric motor means 31.

Preferably, many of the several main components discussed above for transfer pump 23 are generally made of stainless steel and are generally welded together to form sealed joints to resist any undesirable processed liquid and/or fresh water from exiting transfer pump 23 and/or from entering the components of transfer pump 23 other than as discussed hereinabove. Contrary to prior art transfer pumps, transfer pump 23 is designed such that there is no leakage of fluids from the pump 23 into the tank 1 which would add to the volume of radioactive liquid waste in the tank 1 which must be ultimately and properly disposed of in the manner discussed hereinabove.

Transfer pump 23 may be designed to dispense the accumulation of sludge on the formation of aluminate crystals between close running surfaces during extended periods of inactivity. All running clearances are preferably maximized to reduce the complete crystallization across the several clearances and to reduce the shear strength of any crystals that bridge the clearances. For example, the radial clearance between stator can 45 and rotor can 49 may be about 0.140 inch; the clearance between the upper shroud of impeller 67 and lower end plate 95 may be about 0.50 inch; and the axial clearance between upper impeller 67 and casing 99 may be about 0.100 inch. Purge feed lines 201, 203, and 205 are strategically located such relative to upper radial bearing assembly 71, thrust bearing assembly 75, and impeller assembly 29, respectively, so as to clean out the sludge or aluminate crystals prior to operating transfer pump 23.

Electric motor means 31, which may be a high slip, high starting torque type motor with a motor slip of almost 11% and a starting torque of about 62 ft-lbs. at 460 volts, preferably has a relatively high temperature insulation system which is capable of providing at least 40 years of continuous operating life at 200° C. Such insulation system may consist of mica, silicone, and glass varnishes in various combinations and parts. This insulation system enables the "canned" motor transfer pump 23 to use the resident 200° F. process fluid for cooling electric motor means 31. That is, the temperature rise that this insulation system can withstand above ambient temperature (200° F.) is much higher than conventional insulation systems, and allows relative high winding operating temperatures. A preliminary thermal analysis of the cooling of electric motor means 31 has indicated a maximum winding surface temperature for electric motor means 31 as being about 200° C., with a resultant operating life being greater than 40 years. The insulation system of electric motor means 31 has been tested in radiation environments up to 1,000 megarads, which far exceeds the 300 megarads expected in the environment in which transfer pump 23 will generally be employed. Additionally, the power cables 55 may be coated with a radiation resistant material, such as asbestos, which resists radiation up to 1,000 megarads and which has a 40 year thermal life expectancy for temperatures at about 200° F. Use of this insulation system as discussed hereinabove allows transfer pump 23 to use a process fluid of about 200° F. for cooling electric motor means 31.

The structure and features of transfer pump 23 of FIGS. 2–9 contribute to give transfer pump 23 a minimum operating life in excess of about 10,000 hours over a 10-year period for a liquid waste maximum temperature of about 200° F.

Preferably, transfer pump 23 will be capable of cavitation-free operation with a minimum available net positive suction head of about 10 feet which corresponds to an approximate 5,700 suction specific speed.

From the above, it will be appreciated that transfer pump 23 requires no shafting, and no motor-to-pump coupling, and thus, requiring no dynamic seals such as that required in the prior art transfer pump 5 of FIG. 1. The absence of mechanical seals and contacting bearing assemblies significantly enhances the life of transfer pump 23 in that little or no maintenance is needed throughout the expected 10,000 hour life for transfer pump 23 of the present invention.

Figure 10:
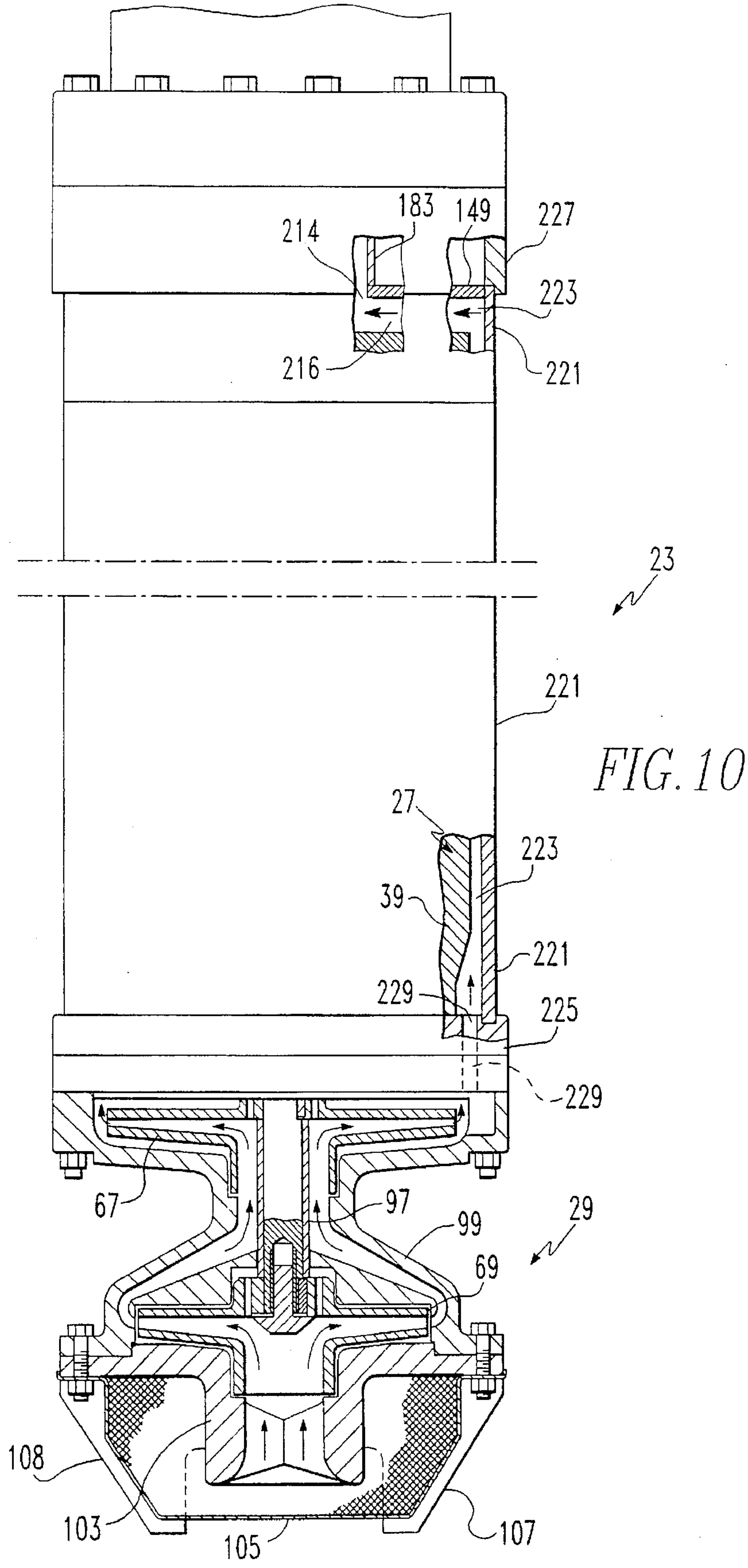
FIG. 10 is an enlarged, partly broken away, elevational view of a lower portion of a transfer pump showing a further embodiment of the present invention involving an annular jacket arranged around the electric motor means which directs the liquid waste from the impeller assembly and alongside the motor housing and back into the transfer pump for cooling the electric motor means and cooling and/or lubricating the bearing assemblies.

FIG. 10 shows a second embodiment for directing and discharging the liquid waste out of impeller assembly 29 and up along motor housing means 27 and the purge lines for purge feed lines 201, 203, and 205 of FIG. 2 and down into electric motor means 31 of FIGS. 1–9. The several components of the transfer pump 23 of FIG. 10 are the same as those discussed with respect to FIGS. 1–9 and therefore the same numerals represent like components.

This second embodiment of FIG. 10 employs an annular jacket 221 which, in essence, replaces the discharge assembly 111 with pipe 135 of FIGS. 2 and 3B. Annular jacket 221 is concentrically arranged primarily around motor housing means 27 and the several components which house the radial and thrust bearing assemblies 71, 73 and 75, respectively, of FIGS. 1–9, and forms an annulus 223 therebetween and therearound. Jacket 221 is mounted at its ends to a lower and an upper annular member 225 and 227, respectively. Lower annular member 225 has several spaced-apart channels, one indicated at numeral 229, in communication with annulus 223. As shown at the upper portion of FIG. 10, annulus 223 is in communication with a radial port 216 in annular support plate 149 of FIG. 2 which radial port 216 is in communication with the axial opening 214, in pipe section 183 of FIG. 3A. Most of the liquid waste which is pumped up into transfer pump 23 by impeller assembly 29 is drawn up through channels 229 of lower annular member 225 into annulus 223 and into the radial ports 216 in upper member 149, with some of the liquid waste being forced up into the thrust bearing assembly 75 and the lower radial bearing assembly 73 in a manner as discussed above with regard to FIGS. 1–9 whereby the solid waste particles are ground down by the bearing members and rings 139 and 141.

As the liquid waste is being carried up into annulus 223 formed by jacket 221 and the several components housing electric motor means 31, and bearing assemblies 71, 73, and 75 and into the axial opening 214 of member 149, some of the liquid tends to flow down into the clearances of the several members or components of the motor housing means 27 and into motor cavity 138. However, most of the liquid waste exits the transfer pump 23 through section pipe 183 (FIG. 3A) and out of column assembly 25 in a manner similar to that discussed with reference to FIGS. 1–9.

The liquid waste which flows down into the clearances travels into motor cavity 138 and into the upper radial bearing assembly 71 wherein the solid particles are ground down. From there, the liquid waste flows into the annulus formed by the stator and rotor cans 45, 49, and into lower radial bearing assembly 73 and thrust bearing assembly 75 and back into the main stream of the liquid waste in impeller assembly 29 where it is recirculated through the system of transfer pump 23.

Any solid waste particles in the flow of liquid waste which travels down into electric motor means 31 in the manner described in the preceding paragraph are ground down particularly by bearing members 63*a* and 63*b* of radial bearing assembly 71 in a manner discussed with regard to FIGS. 1–9. This liquid waste traveling in the manner discussed immediately herein serves to lubricate and/or cool the bearing assemblies 71, 73, and 75 and to cool the electric motor means 31.

As alluded to hereinabove, the several components for transfer pump 23 of FIG. 10 are constructed and operate similarly to those discussed in connection with transfer pump 23 of FIGS. 1–9, with the exception of jacket 221 which provides an alternate means for additionally cooling the canned motor means 31 and for cooling and/or lubricating bearing assemblies 71, 73, 75 of transfer pump 23.

It will also be appreciated that the transfer pump 23 of FIGS. 1–9 and 10 is completely submerged inside the liquid waste 3 in tank 1 of FIG. 1, and instead of preventing the liquid waste from coming into contact with bearing assemblies 71, 73 and 75 and electric motor means 31, transfer pump 23 uses the head generated by the hydraulics of impeller assembly 29 to pump the liquid waste into the motor cavity 138 to cool electric motor means 31 and to cool and/or lubricate bearing assemblies 71, 73 and 75.

It will be further appreciated that an improved transfer pump 23 for a highly radioactive waste tank has been disclosed which positions a canned motor means 31 in close proximity to an impeller assembly 29 and uses the hydraulic head of the impeller assembly 29 to circulate liquid waste 3 through the canned motor means 31 to cool the electrical motor means 31 and/or to cool and lubricate the bearings 71, 73, and 75. It is to be further appreciated, that even though the transfer pump 23 disclosed herein is used in a harsh, abrasive environment, that its expected operating life has been extended at least 50 times over prior art transfer pump designs.

Referring now to FIGS. 11, 12A, 12B, 12C, and 13, there is shown a variable level suction device 231, which is a further embodiment of the present invention and which preferably is used in conjunction with a transfer pump 233 which is similar to that described with particular reference to FIGS. 1 through 9.

Transfer pump 233 of FIGS. 11, 12A, 12B, and 12C comprises a column assembly 235, motor housing means 234 connected to column assembly 235 and having electric motor means 236 and radial bearing assemblies 237 and 239 and a thrust bearing assembly 241, and an impeller assembly 243 connected to motor housing means 234.

Figure 12A:
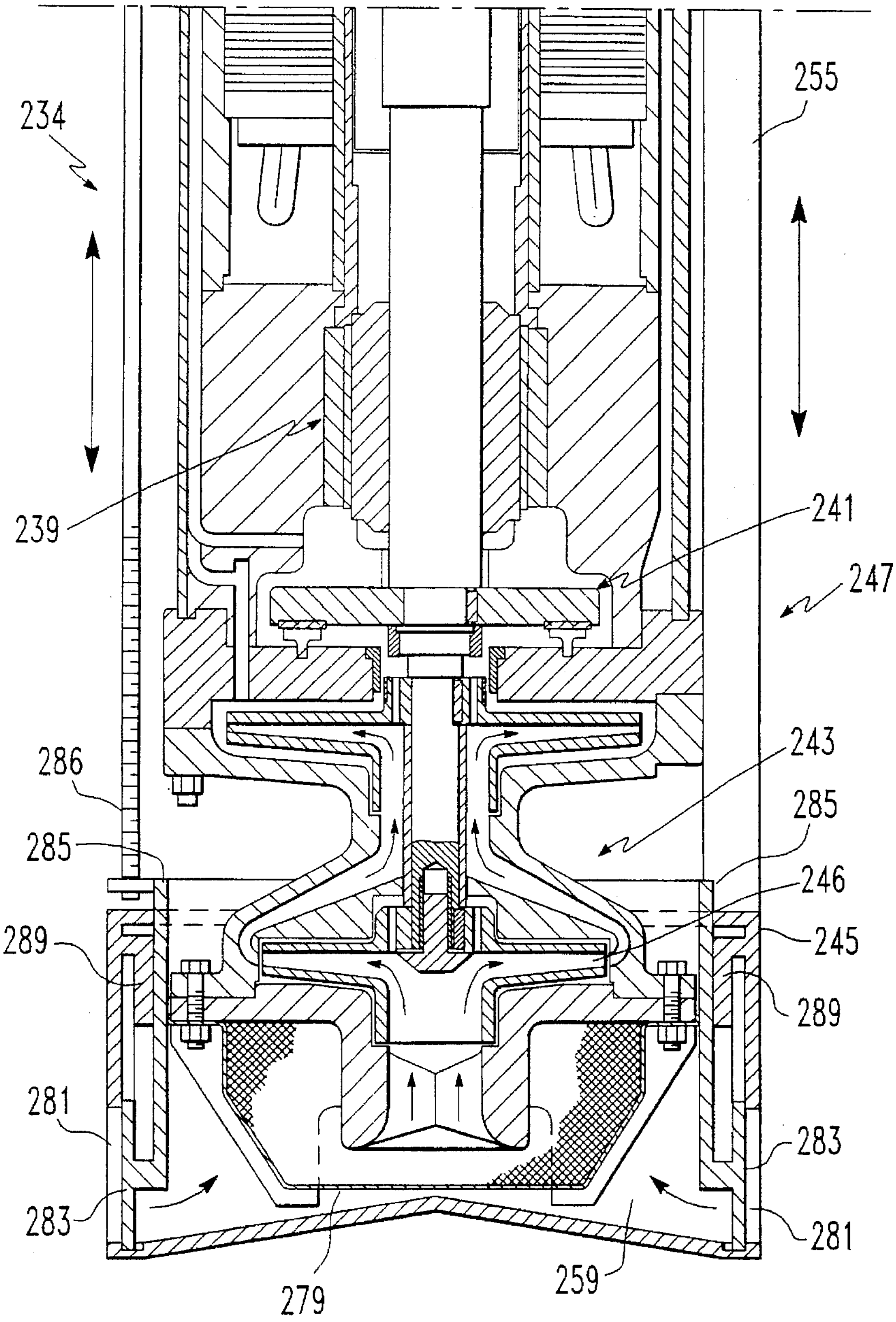
FIGS. 12A, 12B, and 12C are enlarged cross-sectional views showing in more detail the variable level suction device of FIG. 11.

As particularly shown in FIG. 12A, variable level suction device 231 essentially comprises an hydraulic housing 245 which encloses the lower portion of impeller assembly 243, and a telescoping pipe assembly 247 which essentially is an adjustable suction conduit means which is welded to housing means 245.

Figure 12B:
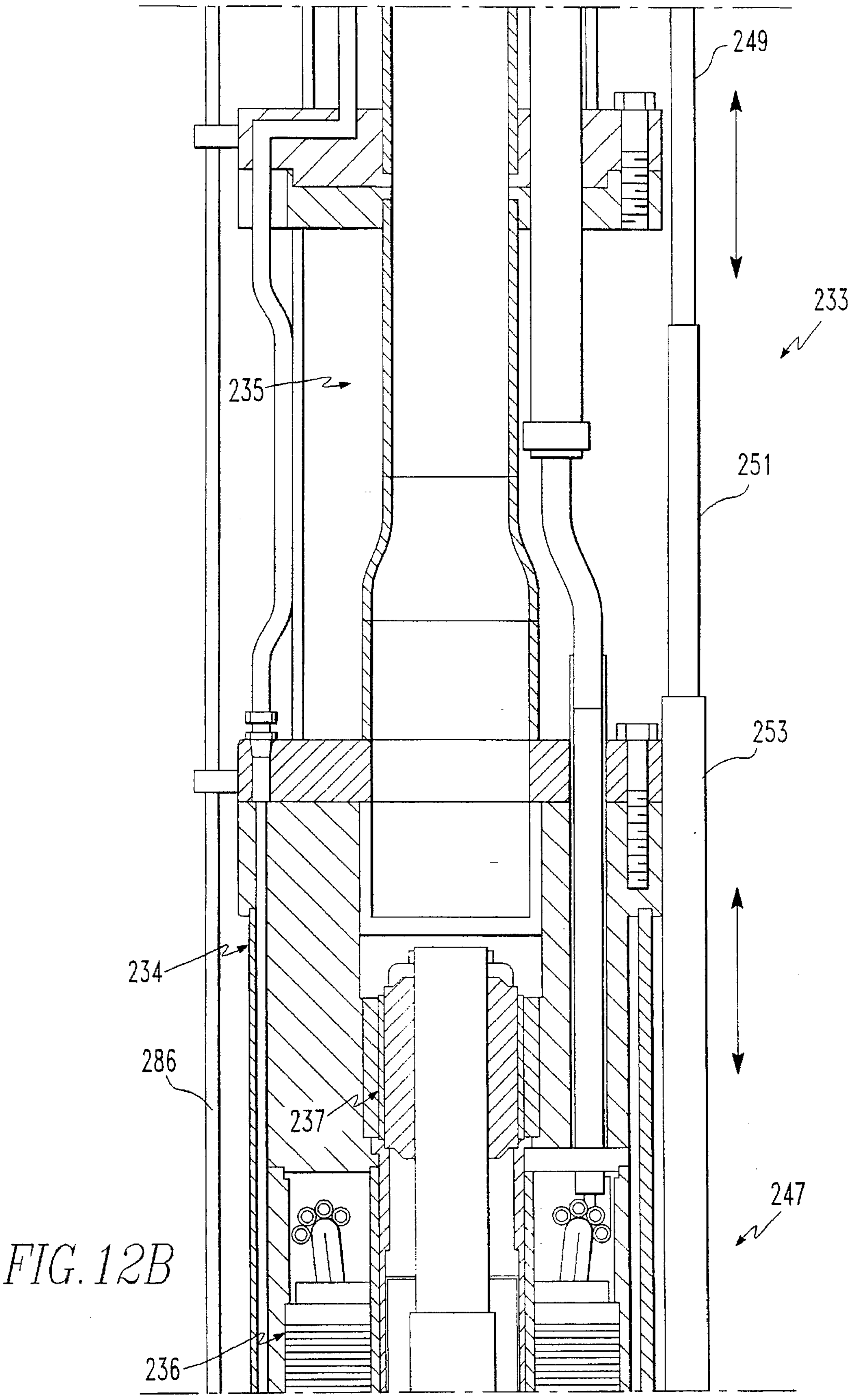
Figure 12C:
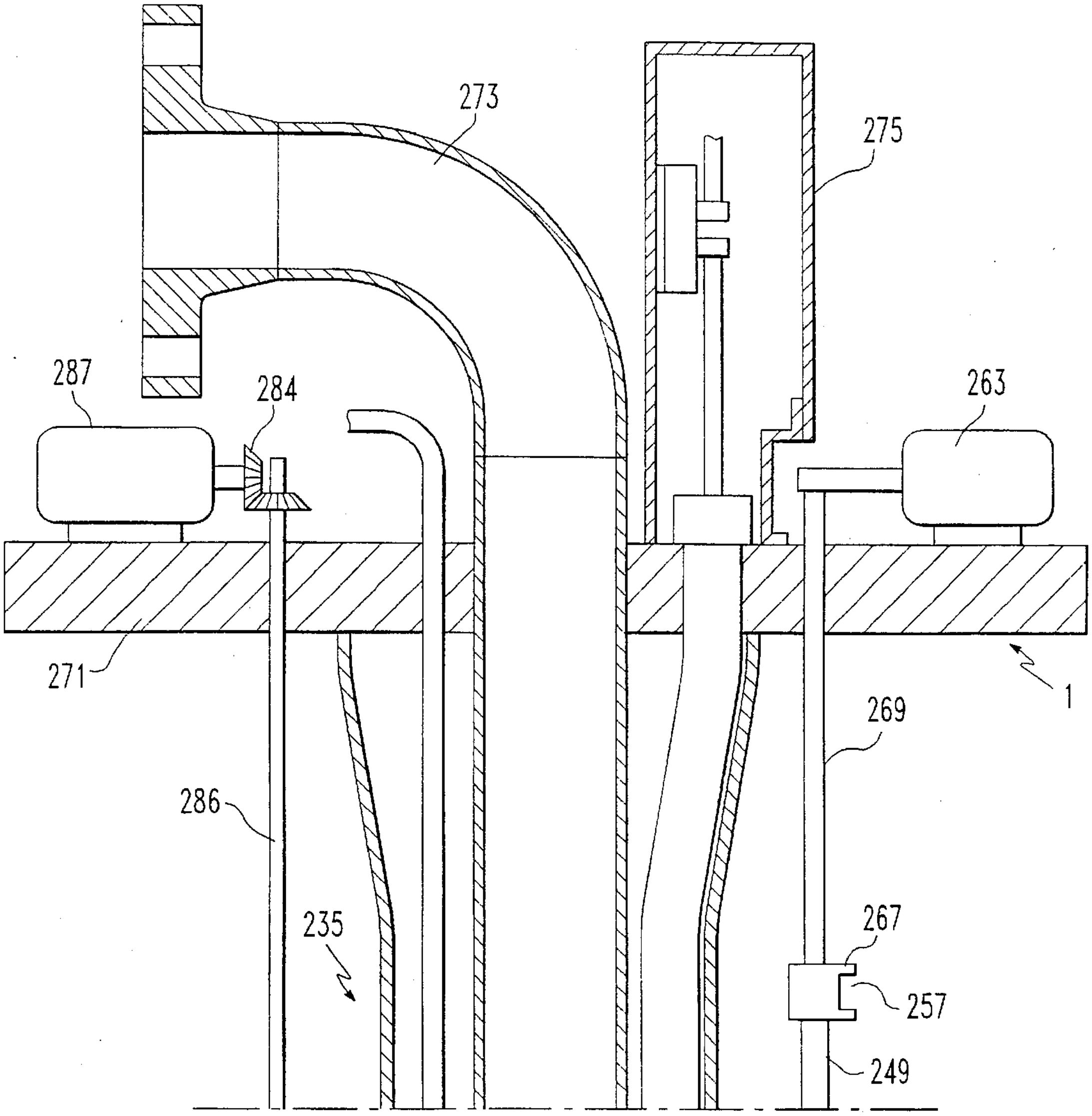

As particularly shown in FIGS. 12A, 12B, and 12C, telescoping pipe assembly 247, in operation, is submerged in liquid waste 3 of waste tank 1 and comprises several telescoping pipe sections 249, 251, 253, and 255, where the inner pipe section 249 has liquid inlet means 257 and where the outermost pipe section 255 is welded to housing means 245 and is in flow communication with chamber 259 of housing means 245. (FIG. 12A.) Telescoping pipe sections 249, 251, 253, and 255 have increasing diameters when considered in order from innermost pipe section 249 to intermediate pipe sections 251 and 253 to outermost pipe section 255 so that these pipe sections can expand and retract within each other in a telescoping fashion. Also, as in a usual manner, the appropriate ends of pipe sections 249, 251, 253, and 255 have overlapping top and bottom flanges (not shown) so that when expanded, each pipe section 249–255 is interlocked with its immediately concentrically arranged pipe section.

Figure 11:
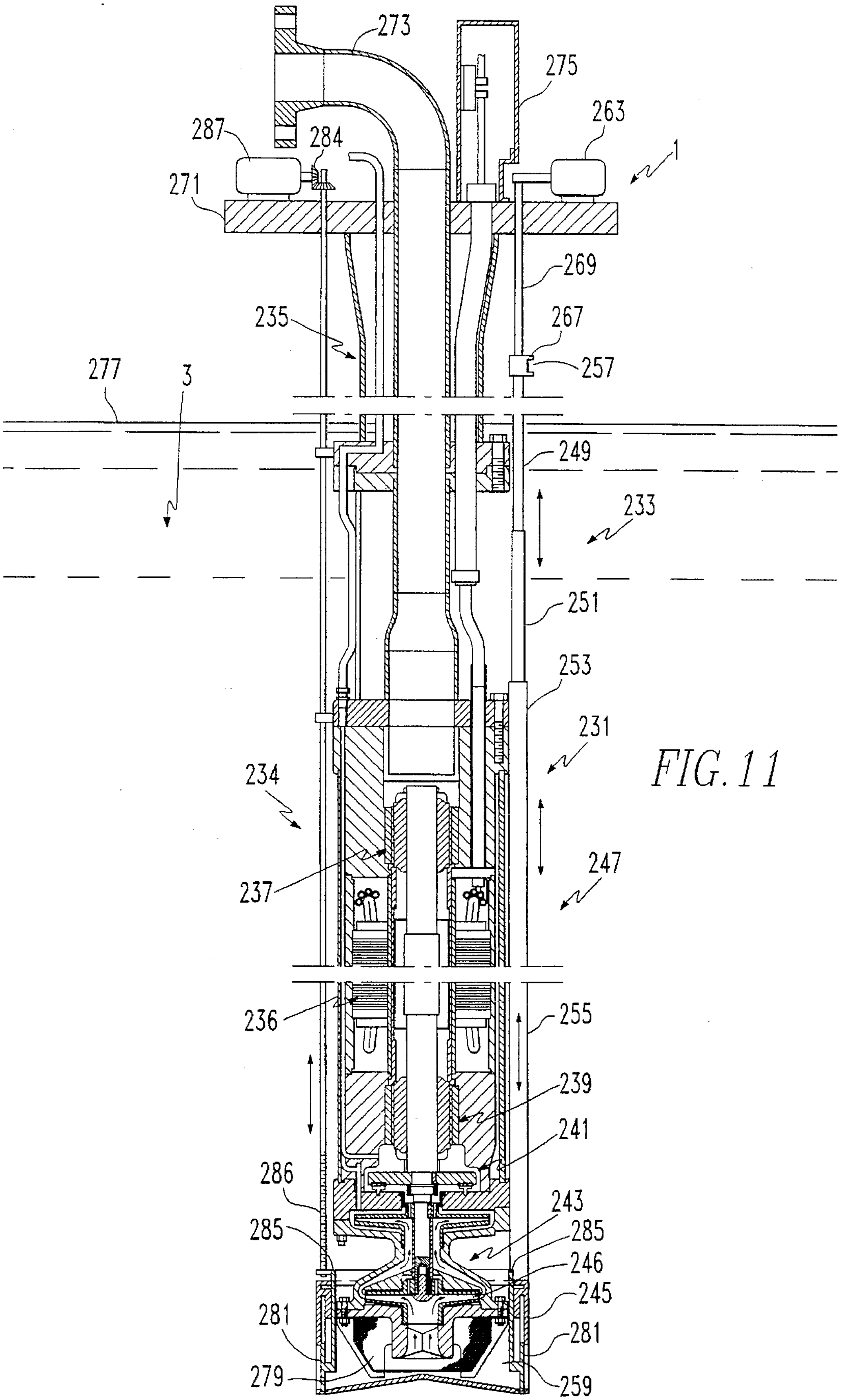
FIG. 11 is a cross-sectional view showing a further embodiment of the present invention which comprises a variable level suction device used in conjunction with a transfer pump.
Figure 13:
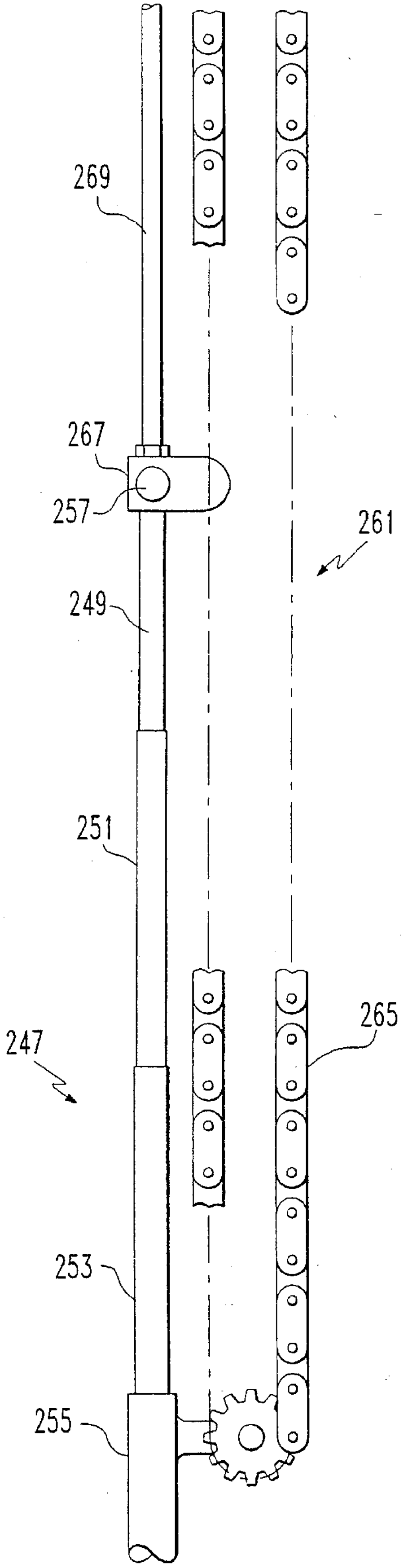
FIG. 13 is a side elevational view showing in more detail the chain and sprocket assembly for motivating the telescoping pipe assembly of FIG. 11.

The expanding and retracting of pipe assembly 247 is accomplished through a motor driven actuator which comprises a chain and sprocket assembly 261 as shown in FIG. 13 driven by a motor 263 as shown in FIG. 11. Chain 265 is mounted on innermost pipe segment 249 through a bracket 267 which forms inlet opening 257 which is in flow communication with the cavities in pipe sections 249–255.

Pipe sections 249–255 are assembled over a guide rod 269. The bottom flange (not shown) of each pipe section 249, 251, and 253 have radial supports which extend toward the guide rod 269 and which radial supports cooperate with guide rod 269 to center pipe assembly 247 and provide vertical tracking and alignment for chain and sprocket assembly 261 to raise and lower pipe sections 249–255.

As best shown in FIGS. 11 and 12C, motor 263 is mounted on a mounting plate 271 on top of waste tank 1 which supports a discharge pipe section 273 of column assembly 235 and electrical connection means 275 for electric motor means 236 similar to that disclosed with reference to FIGS. 1–9.

Operation of motor 263 drives chain 265 and vertically slides pipe sections 249–255 along guide rod 269.

The bores of pipe sections 249–255 are relatively small, for example, about 2-½ to about 4 inches, and therefore, have sufficiently close tolerances therebetween to minimize leakage of the liquid waste through the joints formed by the top and bottom interconnected flanged ends of each appropriate section 249–255. This feature, in addition to the construction of the bottom flanged ends of pipe sections 249, 251, and 253 and their cooperation with guide rod 269, provides enough flexibility for pipe assembly 247 so as to accommodate any substantial movement of column assembly 235 relative to telescoping pipe assembly 247.

Motor 263 operates chain and sprocket assembly 261 to progressively raise and lower pipe sections 245, 251, and 253 in and out of fixed outermost pipe section 255 within a range of liquid waste levels in waste tank 1. This range level may be defined as being from a top surface 277, which is commonly referred to as a "free surface" to a liquid waste surface, which may be a couple of feet from the bottom of the waste tank 1, depending on the minimum pipe section length selected for the overall column for pipe assembly 247. Pipe sections 249, 251, and 253 are articulated from a compressed state on housing 245 to may elevation starting from the top end of the compressed state up to or above the free surface 277 in tank 1. Impeller assembly 243 must be positioned at least approximately six inches from the bottom of waste tank 1 in order for it to be operated.

Hydraulic housing 245 is in flow communication with the conduit of outermost pipe section 255 and encloses the suction inlet 279 of impeller assembly 243. As shown particularly in FIG. 12A, hydraulic housing 245 has suction ports 281, each having a gate 283 and an actuator rod 285 connected to gate 283 as shown in FIG. 12A. Hydraulic housing 245 forms an hydraulic chamber 259 around a lower impeller 246 of impeller assembly 243, from which chamber 259, impeller 246 draws its pumped waste, and which allows suction to be drawn from either the bottom of tank 1 through suction ports 281 in housing 245 or from the telescoping pipe assembly 247, as shown in FIGS. 11 and 12A.

An actuator rod 286 extends parallel and adjacent to transfer pump 233, and is mechanically connected through a worm-gear unit 284 to motor 287 (FIG. 12C) for its reciprocation in reciprocating each rod 285 for opening and closing suction port 281. It is to be appreciated that each actuator rod 285 for each suction port 281 are mechanically interconnected and connected to actuator rod 286 and operated by motor 287. When actuator rod 286 is operated, gate 283 slides in and out of a guide member 289 welded to an innerwall of housing 245 as shown in FIG. 12A.

Even though only two suction ports 281 are shown in FIG. 12A, it is to be appreciated that several suction ports 281 may be provided. Also, gate 283 and actuator rod 286 may be hydraulically operated through an hydraulic piston cylinder assembly.

Operation of the variable level suction device 231 of FIGS. 11, 12A, 12B, 12C and 13 allows the transfer pump 233 to create suction for drawing in liquid waste from varying levels in waste tank 1.

If liquid waste is to be drawn in from the bottom of waste tank 1 where impeller assembly 243 is located, then the variable level suction device 233 is operated to bring pipe section 249 above the free surface 277 of liquid waste 3 and the gate 283 of suction port means 281 is opened. This allows the liquid waste 3 to be drawn through gate 283 and into suction inlet 279 of impeller assembly 243 and up through transfer pump 233 for its discharge through column assembly 235. If liquid waste is to be drawn from other levels of waste tank 1, the variable level suction device 233 is operated to position pipe section 249 in this predetermined elevation below the free surface 277 of liquid waste 3, and gate 283 of suction port 281 is closed. This allows the liquid waste 3 to be drawn into pipe assembly 247 and hydraulic housing 245 and up into impeller assembly 243 for its discharge through column assembly 235.

It will be appreciated that the variable level suction device 231 may easily be used with any length of transfer pump 233 whose length can be determined and adjusted by the number of pipe sections of column assembly 235 as disclosed with particular reference to FIG. 2.

It will be appreciated that the combination of transfer pump 233 and the variable level suction device 231 provides a means whereby suction can be created and, therefore, liquid waste can selectively be drawn in from varying or discrete levels in a waste tank.

While specific embodiments of the invention have been disclosed, it will be appreciated by those skilled in the art that various modifications and alterations to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. A submersible motor transfer pump for transferring liquid waste inside a waste tank out of said waste tank, comprising:

a column assembly containing electrical power cable means and extending into said waste tank, a motor housing having electric motor means, said motor housing connected to said column assembly for positioning said electric motor means down into said waste tank, said electric motor means having a stator assembly and a rotor assembly spaced apart to form an annulus therebetween, said stator assembly having a stator can and said rotor assembly having a rotor can and a shaft rotatable therewith, an impeller assembly having impeller means connected to said shaft of said rotor assembly for drawing in said liquid waste, said impeller assembly further including a casing for housing said impeller means and connected to said motor housing, a suction adapter connected to said impeller means and said casing for seating said impeller means in said casing and for drawing said liquid waste into said impeller assembly, and an inlet screen connected to said suction adapter with a sparge ring located in said inlet screen, bearing means for mounting said electric motor means in said motor housing, and a first water supply means extending parallel to said column assembly and into said motor housing and said impeller assembly for delivering pressurized fresh water thereto to flush out said liquid waste therefrom, said impeller means of said impeller assembly structured to create an hydraulic head for said liquid waste and to force said liquid waste into said motor housing for lubricating and cooling said bearing means and for cooling said electric motor means, and said column assembly having means for transporting said liquid waste from said impeller assembly and out of said transfer pump.

2. A submersible motor transfer pump of claim 1, wherein said bearing means includes radial bearing assemblies and a thrust bearing assembly associated with said shaft, and further comprising liquid flow means associated with said motor housing for circulating said liquid waste through said radial bearing assemblies and said thrust bearing assembly and said annulus between said stator assembly and said rotor assembly for at least said cooling of said electric motor means.

3. A submersible motor transfer pump of claim 2, wherein said liquid flow means comprises jacket means concentrically arranged at least around said electric motor means and said motor housing means.

4. A submersible motor transfer pump of claim 2, further comprising means between said motor housing and said column assembly having first channel means being part of said liquid flow means for directing said liquid waste out of said motor housing and second channel means for directing the flow of said pressurized water from said first water supply means into said motor housing.

5. A submersible motor transfer pump of claim 1, further comprises second water supply means extending parallel to said column assembly for delivering pressurized fresh water to said sparge ring to flush out said liquid waste therefrom.

6. A submersible motor transfer pump of claim 1, wherein said impeller means consists of an upper impeller, a lower impeller, and an impeller spacer between said upper impeller and said lower impeller, and wherein said casing consists of a first diffuser for said lower impeller and a second staged dumped diffusion device for said upper impeller.

7. A submersible motor transfer pump of claim 1, wherein said column assembly is comprised of a plurality of modular pipe sections and purge feed line means for delivering fresh water to said electric motor means and to said impeller assembly and conduit means for supporting said electrical power cable means.

8. A submersible motor transfer pump for transferring liquid waste inside a waste tank out of said waste tank, comprising:

a column assembly containing electrical power cable means and extending into said waste tank, a motor housing having electric motor means, said motor housing connected to said column assembly for positioning said electric motor means down into said waste tank, said electric motor means having a stator assembly and a rotor assembly spaced apart to form an annulus therebetween, said stator assembly having a stator can and said rotor assembly having a rotor can and a shaft rotatable therewith, an impeller assembly having impeller means connected to said shaft of said rotor assembly for drawing in said liquid waste, and bearing means for mounting said electric motor means in said motor housing, said impeller means of said impeller assembly structured to create an hydraulic head for said liquid waste and to force said liquid waste into said motor housing for lubricating and cooling said bearing means and for cooling said electric motor means, said column assembly includes discharge conduit means; and further comprising:

variable level suction means, comprising:

an hydraulic encasement means having suction port means and encasing at least a portion of said impeller assembly, adjustable suction conduit means having an inlet and connected to said hydraulic encasement means, and means for selectively operating said suction port means and said adjustable suction conduit means for drawing said liquid waste into said inlet of said adjustable conduit means along a selected level in said waste tank below a free surface of said liquid waste and for drawing said liquid waste directly into said hydraulic encasement along a liquid level where said impeller assembly is located for discharging said liquid waste through said impeller assembly and said discharge conduit means of said column assembly.

9. A submersible motor transfer pump of claim 8, wherein said adjustable suction conduit means comprises a telescoping pipe assembly having a plurality of pipe sections, an inlet pipe section of which has said inlet.

10. A submersible motor transfer pump of claim 9, wherein said means for selectively operating said adjustable suction conduit means comprises motive means mounted above said free surface and drive means connected to said motive means and to said inlet pipe section for raising and lowering said pipe assembly for positioning said inlet pipe section above and below said free surface of said liquid waste, wherein said suction port means includes slidable gate means for opening and closing said hydraulic encasement means, and wherein said means for operating said suction port means comprises motive means mounted above said free surface and drive means connected to said slidable gate means, whereby when said gate means is operated to close said suction port means said inlet pipe section is positioned in a desired level of said liquid waste for said drawing of said liquid waste into said inlet of said inlet pipe section, and when said gate means is operated to open said suction port means, said inlet pipe section is positioned above said free surface for said drawing of said liquid waste directly into said hydraulic encasement means and said impeller assembly.

* * * * *